United States Patent
Okada et al.

(10) Patent No.: US 10,812,207 B2
(45) Date of Patent: Oct. 20, 2020

(54) RECEPTION APPARATUS AND DATA PROCESSING METHOD

(71) Applicants: SONY CORPORATION, Tokyo (JP); SONY SEMICONDUCTOR SOLUTIONS CORPORATION, Atsugi-shi (JP)

(72) Inventors: Satoshi Okada, Tokyo (JP); Kazuyuki Takahashi, Chiba (JP); Takeshi Ohno, Saitama (JP)

(73) Assignees: SONY CORPORATION, Tokyo (JP); SONY SEMICONDUCTOR SOLUTIONS CORPORATION, Atsugi-shi (JP)

(*) Notice: Subject to any disclaimer, the term of this patent is extended or adjusted under 35 U.S.C. 154(b) by 0 days.

(21) Appl. No.: 16/482,390

(22) PCT Filed: Feb. 28, 2018

(86) PCT No.: PCT/JP2018/007408
§ 371 (c)(1),
(2) Date: Jul. 31, 2019

(87) PCT Pub. No.: WO2018/168456
PCT Pub. Date: Sep. 20, 2018

(65) Prior Publication Data
US 2020/0028604 A1    Jan. 23, 2020

(30) Foreign Application Priority Data

Mar. 14, 2017  (JP) ................. 2017-049173

(51) Int. Cl.
*H04H 40/18*  (2008.01)
*H04H 60/32*  (2008.01)
*H04H 60/37*  (2008.01)

(52) U.S. Cl.
CPC ............ *H04H 40/18* (2013.01); *H04H 60/32* (2013.01); *H04H 60/37* (2013.01)

(58) Field of Classification Search
CPC ......... H04H 40/18; H04H 60/32; H04H 60/37
See application file for complete search history.

(56) References Cited

U.S. PATENT DOCUMENTS

| | | | | |
|---|---|---|---|---|
| 7,944,917 B2* | 5/2011 | Cha | .......................... | H04L 45/00 370/389 |
| 2005/0009290 A1* | 1/2005 | Yan | ................... | H01L 21/76229 438/424 |

(Continued)

FOREIGN PATENT DOCUMENTS

| | | |
|---|---|---|
| CA | 2 945 747 A1 | 8/2016 |
| JP | 2000-134168 A | 5/2000 |

(Continued)

OTHER PUBLICATIONS

International Search Report dated May 29, 2018 in PCT/JP2018/007408 filed Feb. 28, 2018.

(Continued)

*Primary Examiner* — Janice N Tieu
(74) *Attorney, Agent, or Firm* — Oblon, McClelland, Maier & Neustadt, L.L.P.

(57) ABSTRACT

A reception apparatus includes a demodulation circuit configured to demodulate packets obtained with respect to each of multiple PLPs included in a broadcast signal; and a processing circuit configured to process the packets demodulated by the demodulation circuit. The demodulation circuit and the processing circuit are connected with each other via a single interface or interfaces fewer than the number of the PLPs. The demodulation circuit adds identification information to a specific packet among the packets obtained with respect to each of the PLP, the identification information identifying the PLP to which each of the packets (Continued)

belongs. The processing circuit identifies the PLP to which belongs each of the packets input from the demodulation circuit via the single interface or the interfaces fewer than the number of the PLPs, based on the identification information obtained from the specific packet.

9 Claims, 25 Drawing Sheets

(56) References Cited

U.S. PATENT DOCUMENTS

| | | | |
|---|---|---|---|
| 2016/0197826 A1* | 7/2016 | Yang | H04L 69/22 370/392 |
| 2017/0006248 A1 | 1/2017 | An et al. | |
| 2019/0289340 A1* | 9/2019 | Kwak | H04N 21/2381 |

FOREIGN PATENT DOCUMENTS

| | | |
|---|---|---|
| WO | WO 2017/039272 A1 | 3/2017 |
| WO | WO 2017/122544 A1 | 7/2017 |

OTHER PUBLICATIONS

"ATSC Standard: Link-Layer Protocol (A/330)," Advanced Television Systems Committee, Sep. 19, 2016, 8 Pages.

"Digital Video Broadcasting (DVB); Frame structure channel coding and modulation for a second generation digital terrestrial television broadcasting system (DVB-T2)," Final draft ETSI EN 302 755 V1.3.1, Nov. 2011, 189 Pages.

Extended European Search Report dated Feb. 6, 2020 in corresponding European Patent Application No. 18767563.2, 7 pages.

"ATSC Standard: Link-Layer Protocol (A/330)", ATSC Standard: Link-Layer Protocol (A/330), Doc. A/330:2016, XP055555864, Sep. 19, 2016, pp. 1-48.

* cited by examiner

FIG. 11

Header Syntax for ALP Packet Encapsulation

| Syntax | No of bits | Format |
|---|---|---|
| ALP_packet_header () { | | |
|   packet_type | 3 | uimsbf |
|   payload_configuration | 1 | bslbf |
|   if(payload_configuration==0) { | | |
|     header_mode | 1 | bslbf |
|     length | 11 | uimsbf |
|     if(header_mode==1) { | | |
|       single_packet_hdr () | var | Sec. 5.1.2.1 |
|     } | | |
|   } | | |
|   else if(payload_config==1) { | | |
|     segmentation_concatenation | 1 | bslbf |
|     length | 11 | uimsbf |
|     if(segmentation_concatenation==0) { | | |
|       segmentation_hdr () | var | Sec. 5.1.2.2 |
|     } | | |
|     else if(segmentation_concatenation==1) { | | |
|       concatenation_hdr () | var | Sec. 5.1.2.3 |
|     } | | |
|   } | | |
| } | | |

FIG.16
UO-0 PACKET
A. IN CASE WHERE CID IS 15 OR SMALLER
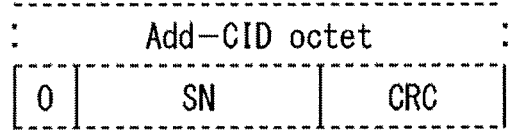
B. IN CASE WHERE CID IS 16 OR LARGER
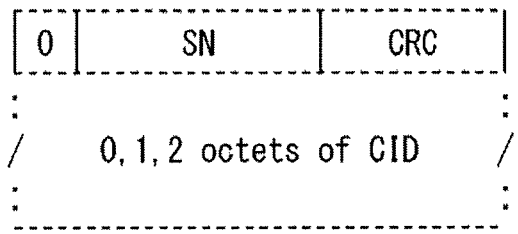

FIG. 23

| Syntax | No. of bits | Mnemonic |
|---|---|---|
| Transport packet of this Recommendation \| International Standard | | |
| transport_packet() { | | |
|   sync_byte | 8 | bslbf |
|   transport_error_indicator | 1 | bslbf |
|   payload_unit_start_indicator | 1 | bslbf |
|   transport_priority | 1 | bslbf |
|   PID | 13 | uimsbf |
|   transport_scrambling_control | 2 | bslbf |
|   adaptation_field_control | 2 | bslbf |
|   continuity_counter | 4 | uimsbf |
|   if(adaptation_field_control=='10' \|\| adaptation_field_control=='11') { | | |
|     adaptation_field() | | |
|   } | | |
|   if(adaptation_field_control=='01' \|\| adaptation_field_control=='11') { | | |
|     for(i=0;i<N;i++) { | | |
|       data_byte | 8 | bslbf |
|     } | | |
|   } | | |
| } | | |

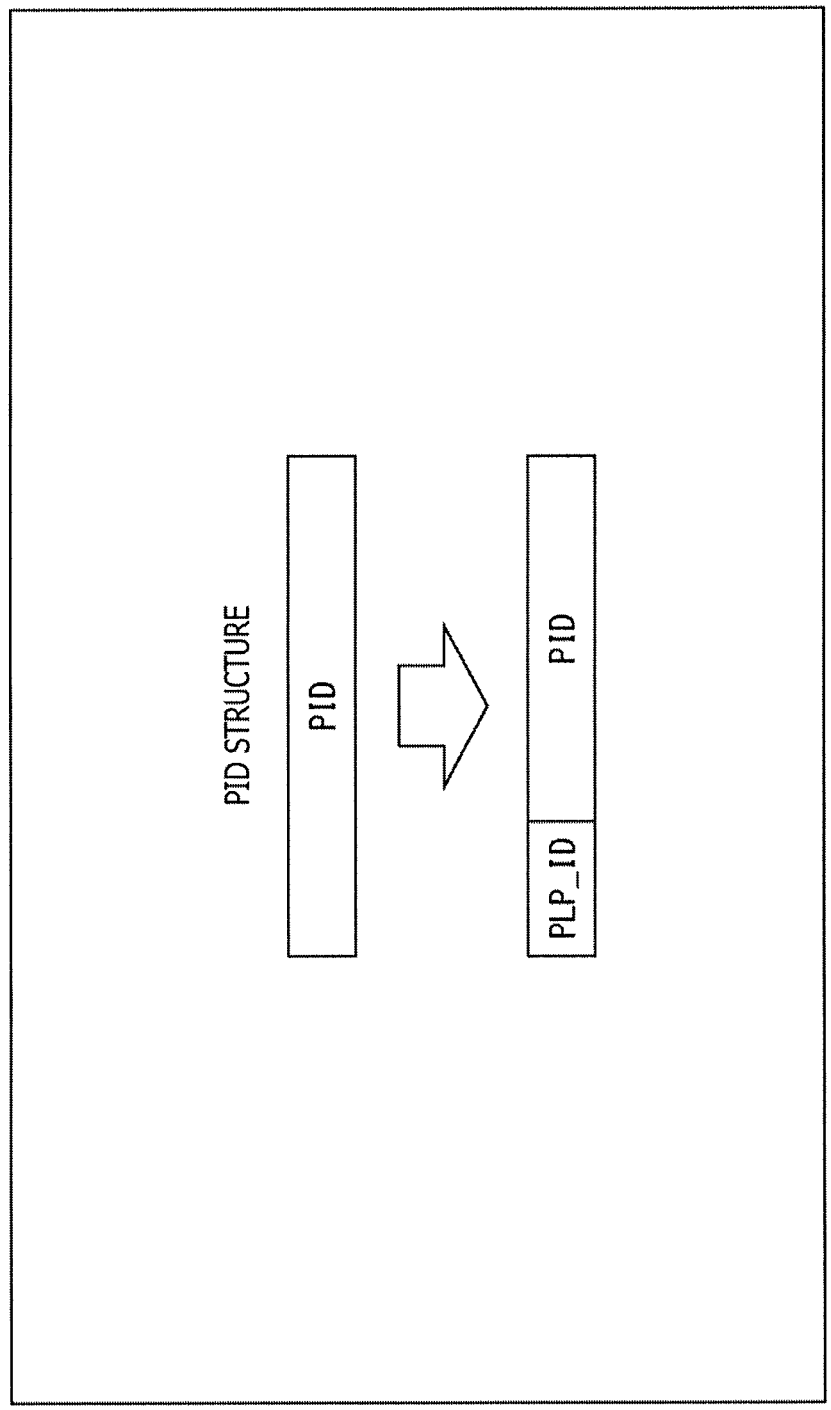

RECEPTION APPARATUS AND DATA PROCESSING METHOD

TECHNICAL FIELD

The present technology relates to a reception apparatus and a data processing method. More particularly, the technology relates to a reception apparatus and a data processing method for easily implementing circuits on the receiving side.

BACKGROUND ART

For example, it has been determined that the ATSC (Advanced Television Systems Committee) 3.0 standard, one of next-generation terrestrial broadcasting standards, adopts the method of primarily using not TS (Transport Stream) packets but IP/UDP, that is, IP (Internet Protocol) packets including UDP (User Datagram Protocol) packets for transmitting data (the method will also be referred to as the IP transmission method hereunder). It is expected that the broadcast methods other than ATSC 3.0 will also adopt the IP transmission method in the future.

Also, under the M-PLP (Multiple PLP) method stipulated by the DVB-T2 (Digital Video Broadcasting-Second Generation Terrestrial) standard, the receiving side has a single interface implemented between upstream circuits that perform the process of reconstructing transport streams (TS) on the one hand and downstream circuits that execute decoding and other processes on the other hand (e.g., see NPL 1).

CITATION LIST

Non Patent Literature

[NPL 1]
ETSI EN 302 755 V1.3.1 (2011-11)

SUMMARY

Technical Problem

Meanwhile, even in the case where the IP transmission method is adopted, the receiving side should preferably have as few interfaces as possible between a demodulation device (demodulation LSI) and a downstream System on Chip (SoC) in view of cost considerations, as in the case of DVB-T2.

As outlined above, the connection implemented with the fewest possible interfaces allows a circuit on the receiving side to be configured with the lowest possible costs. Considering the actual installation, however, it is preferred that the circuit on the receiving side be easily implemented.

The present technology has been devised in view of the above circumstances. An object of the technology is therefore to easily implement a circuit on the receiving side.

Solution to Problem

According to one aspect of the present technology, there is provided a reception apparatus including: a demodulation section configured to demodulate packets obtained with respect to each of a plurality of PLPs (Physical Layer Pipes) included in a broadcast signal; and a processing section configured to process the packets demodulated by the demodulation section. The demodulation section and the processing section are connected with each other via a single interface or interfaces fewer than the number of the PLPs. The demodulation section adds identification information to a specific packet among the packets obtained with respect to each of the PLPs, the identification information identifying the PLP to which each of the packets belongs. The processing section identifies the PLP to which belongs each of the packets input from the demodulation section via the single interface or the interfaces fewer than the number of the PLPs, on the basis of the identification information obtained from the specific packet.

The reception apparatus according to one aspect of the present technology may be either an independent apparatus or an internal block constituting part of a single apparatus. Also, a data processing method according to one aspect of the present technology corresponds to the above-mentioned reception apparatus according to one aspect thereof.

Where the reception apparatus and the data processing method according to one aspect of the present technology are implemented, a demodulation section configured to demodulate packets obtained with respect to each of multiple PLPs included in a broadcast signal is connected with a processing section configured to process the packets demodulated by the demodulation section via a single interface or interfaces fewer than the number of the PLPs. The demodulation section adds identification information to a specific packet among the packets obtained with respect to each of the PLP, the identification information identifying the PLP to which the each of the packets belongs. The processing section identifies the PLP to which belongs each of the packets input from the demodulation section via the single interface or the interfaces fewer than the number of the PLPs, on the basis of the identification information obtained from the specific packet.

Advantageous Effect of Invention

Thus, according to one aspect of the present technology, the circuits on the receiving side are easily implemented.

The advantageous effect outlined above is not limitative of the present disclosure. Further advantages will become apparent from a reading of the present disclosure.

BRIEF DESCRIPTION OF DRAWINGS

FIG. 11 is a schematic diagram depicting an example of the syntax of an ALP header.

FIG. 16 is a schematic diagram depicting typical structures of a UO-0 packet.

FIG. 23 is a schematic diagram depicting an example of the syntax of a TS packet.

FIG. 24 is a schematic diagram depicting a typical structure of a PID.

DESCRIPTION OF EMBODIMENTS

Some embodiments for practicing the present technology are described below with reference to the drawings. The description is given under the following headings.

1. System configuration
2. First embodiment
(1) Method of adding to a first packet in the same PLP
(2) Method of adding to segmentation packets
3. Second embodiment
(1) Method of mapping to CIDs
(2) Method of mapping to PIDs
4. Variations
5. Computer configuration 1. System Configuration (Typical Configuration of the Broadcast System)

Figure 1:
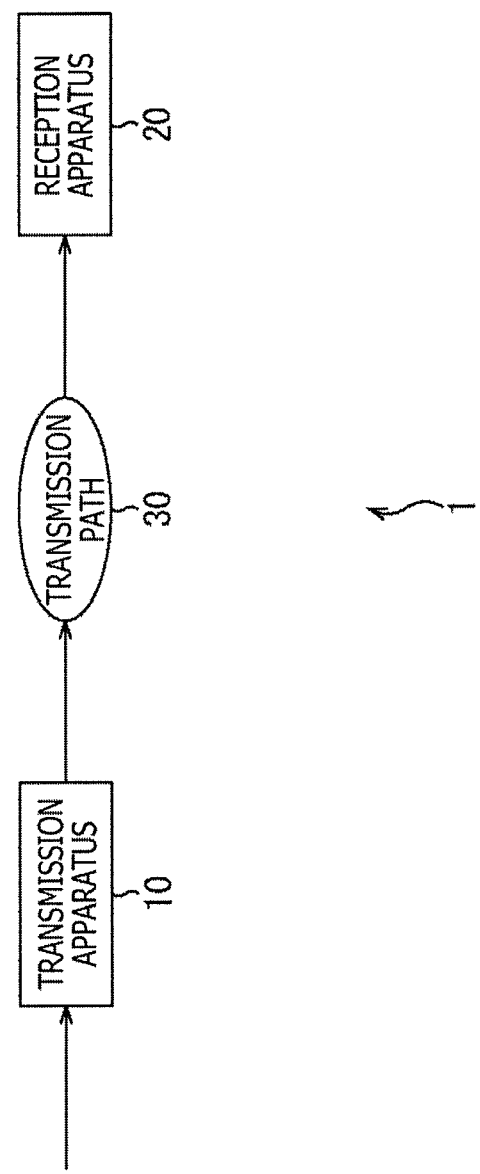
FIG. 1 is a block diagram depicting a typical configuration of a broadcast system to which the present technology is applied.

FIG. 1 is a block diagram depicting a typical configuration of a broadcast system to which the present technology is applied. Incidentally, the word "system" refers to a logical aggregate of multiple apparatuses.

In FIG. 1, the broadcast system 1 includes a transmission apparatus 10 and a reception apparatus 20. The broadcast system 1 performs data transmission in accordance with a predetermined broadcast method.

The transmission apparatus 10 carries out processes such as modulation and error correction on the data of the content input thereto (e.g., broadcast programs), and transmits a broadcast signal obtained from the processing from the transmitting antenna of a transmitting station.

The broadcast signal from the transmission apparatus 10 is received by a reception apparatus 20 such as a television receiver via a transmission path 30 and a receiving antenna installed in the home of each end user, for example. The reception apparatus 20 processes the broadcast signal received via the transmission path 30, and outputs the video and audio data of the content obtained from the processing (e.g., broadcast programs).

Incidentally, the transmission path 30 in the broadcast system 1 may be not only terrestrial waves (terrestrial broadcasts) but also satellite broadcasts using broadcasting satellites (BS) or communications satellites (CS) as well as cable-based common antenna television (CATV), for example.

(Typical Configuration of the Transmission Apparatus)

Figure 2:
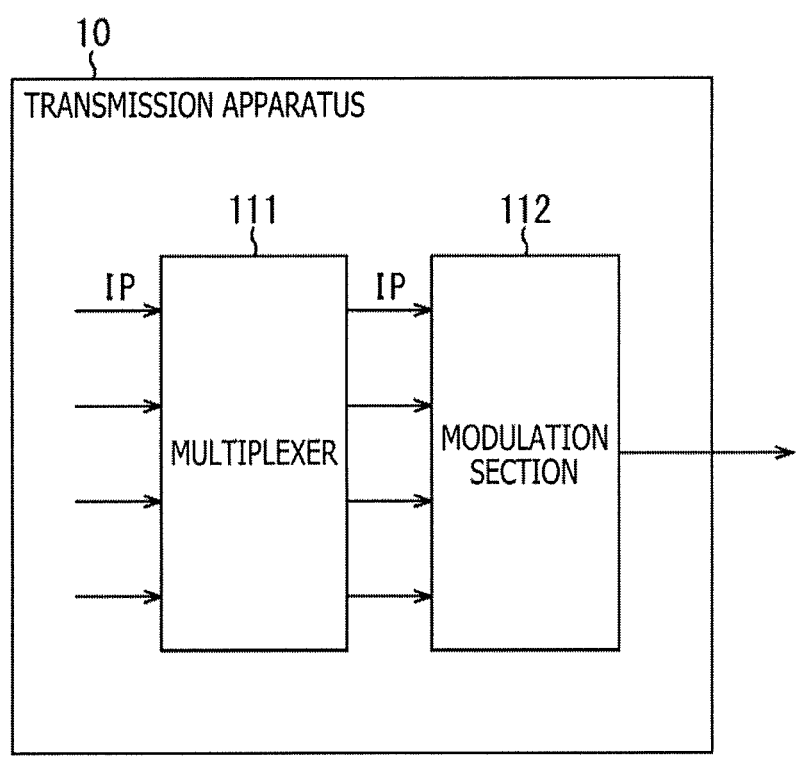
FIG. 2 is a block diagram depicting a typical configuration of a transmission apparatus.

FIG. 2 is a block diagram depicting a typical configuration of the transmission apparatus 10 in FIG. 1.

The transmission apparatus 10 is a transmitter that complies with the IP transmission method. As such, the transmission apparatus 10 transmits a broadcast stream that includes the content such as broadcast programs over the transmission path 30. In FIG. 2, the transmission apparatus 10 includes a multiplexer 111 and a modulation section 112.

The multiplexer 111 processes multiple IP streams input thereto before supplying them to the modulation section 112. Under ATSC 3.0, up to 64 IP streams are input on a predetermined frequency band corresponding to a PLP (Physical Layer Pipe).

The modulation section 112 performs processes related to the physical layer (PHY) such as an error correction coding process and a modulation process on multiple IP streams supplied from the multiplexer 111, and transmits the signal obtained from the processing as a broadcast signal via the transmitting antenna of a transmitting station.

The transmission apparatus 10 is configured as described above.

Whereas FIG. 2 depicts the configuration in which the transmission apparatus 10 alone includes the multiplexer 111 and the modulation section 112, a common broadcast system generally has the multiplexer 111 and the modulation section 112 installed in different locations. For example, the multiplexer 111 may be installed in a data processing apparatus (not depicted) in each broadcast station, whereas the modulation section 112 may be installed in a data processing apparatus (not depicted) in the transmitting station.

Also, whereas the configuration depicted in FIG. 2 adopts the IP transmission method as the data transmission method for processing IP streams, the IP transmission method is not limitative of the data transmission method that may be employed. For example, some other suitable method such as the MPEG2-TS (Transport Stream) method may be adopted. In the case where the MPEG2-TS method is adopted, the transmission apparatus 10 processes TS streams instead of the IP streams.

(Typical Configuration of the Reception Apparatus)

Figure 3:
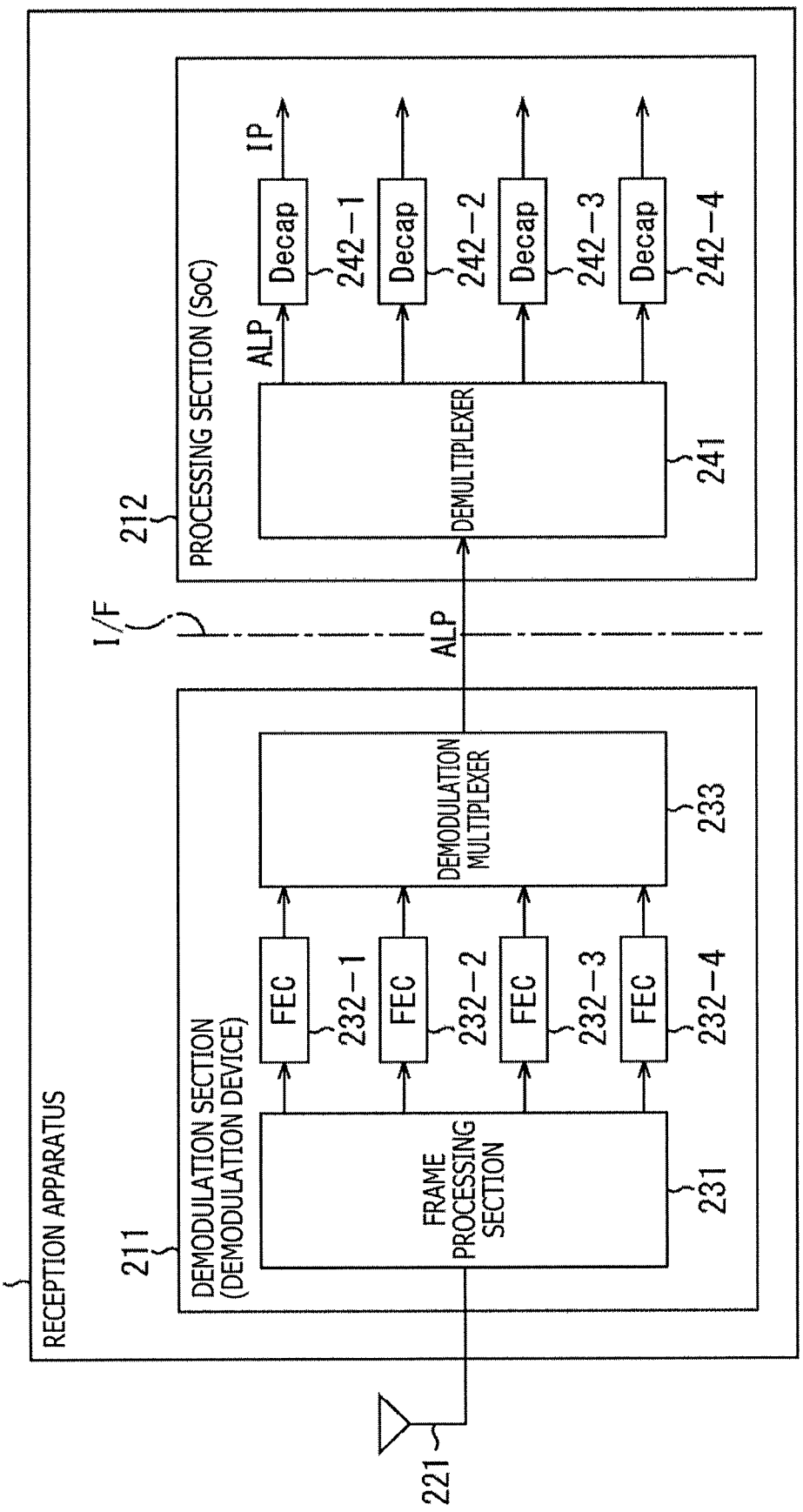
FIG. 3 is a block diagram depicting a typical configuration of a reception apparatus.

FIG. 3 is a block diagram depicting a typical configuration of the reception apparatus 20 in FIG. 1.

The reception apparatus 20 is a receiver that complies with the IP transmission method. As such, the reception apparatus 20 receives broadcast streams transmitted from the transmission apparatus 10 via the transmission path 30, and reproduces the content such as broadcast programs therefrom. In FIG. 3, the reception apparatus 20 includes a demodulation section 211 and a processing section 212.

Here, the demodulation section 211 is configured as a demodulation device such as an RF IC or a demodulation LSI. The processing section 212 is configured as, for example, a System on Chip (SoC). That is, in the reception apparatus 20, the demodulation section 211 and the processing section 212 are configured as different chips.

The demodulation section 211 performs processes related to the physical layer (PHY) such as a demodulation process and an error correction decoding process on the signal input thereto and processes related to the packets, for example, and outputs a single ALP stream resulting from the processing to the downstream processing section 212 via a single interface (I/F).

The demodulation section 211 includes a frame processing section 231, FEC processing sections 232-1 to 232-4, and a demodulation multiplexer 233.

The frame processing section 231 processes physical layer frames obtained from the broadcast signal received via a receiving antenna 221, and supplies the data acquired from the processing to one of the FEC processing sections 232-1 to 232-4 for each PLP.

The FEC processing section 232-1 performs an error correction decoding process on the data input from the frame processing section 231 for each PLP, and supplies the data obtained from the processing to the demodulation multiplexer 233. In the same manner as the FEC processing section 232-1, the FEC processing sections 232-2 to 232-4 carry out the error correction decoding process and supply the data acquired from the processing to the demodulation multiplexer 233.

The demodulation multiplexer 233 processes the streams input from the FEC processing sections 232-1 to 232-4 for each PLP, and outputs a single ALP stream obtained from the processing to the processing section 212 via a single interface (I/F).

The processing section 212 processes a single ALP stream input from the upstream demodulation section 211 via a single interface (I/F), and outputs the IP stream corresponding to a selected broadcast program to downstream circuits (not depicted). The downstream circuits perform processes such as decoding on the video and audio data included in the IP stream so as to reproduce the content of the selected broadcast program, for example.

The processing section 212 includes a demultiplexer 241 and decapsulation sections 242-1 to 242-4.

The demultiplexer 241 processes ALP packets included in the single ALP stream input thereto, and supplies an ALP stream obtained from the processing to one of the decapsulation sections 242-1 to 242-4 for each PLP.

The decapsulation section 242-1 performs a decapsulation process (Decap) on the ALP stream input from the demultiplexer 241 for each PLP, and outputs an IP stream obtained from the processing to downstream circuits. In the same manner as the decapsulation section 242-1, the decapsulation sections 242-2 to 242-4 carry out the decapsulation process (Decap) and output the IP stream acquired from the processing to the downstream circuits.

The reception apparatus 20 is configured as described above.

Incidentally, the reception apparatus 20 is configured as a fixed receiver such as a television receiver, a set-top box (STB), a personal computer, or a game console; or as a mobile receiver such as a smartphone, a mobile phone, or a tablet computer. Furthermore, the reception apparatus 20 may be a wearable computer such as a head-mounted display (HMD).

Whereas the configuration depicted in FIG. 3 adopts the IP transmission method as the data transmission method for processing IP streams, the IP transmission method is not limitative of the data transmission method that may be employed. For example, some other suitable method such as the MPEG2-TS method may be adopted. In the case where the MPEG2-TS method is adopted, the reception apparatus 20 processes TS streams instead of the IP streams.

2. First Embodiment

In a common receiver, multiple interfaces (I/F) are generally provided between the demodulation device and the System on Chip (SoC) with regard to streams that include the content such as broadcast programs.

For example, under ATSC 3.0, one of next-generation terrestrial broadcasting standards, IP (Internet Protocol) packets including UDP (User Datagram Protocol) packets are used for transmitting data. A transmitter under this standard can handle up to 64 PLP (Physical Layer Pipes) on each predetermined frequency band.

On the other hand, the common receiver is required to receive up to four PLPs simultaneously. When the receiver is configured to receive multiple PLPs at the same time, it is possible to provide more robust audio and higher quality video by changing, for example, the modulation method and the encoding method (encoding rate) for each PLP.

In the case of ATSC 3.0, up to 64 IP streams are processed for each predetermined frequency band corresponding to the PLPs. The IP streams include IP packets and include the video and audio components and signaling corresponding to the content such as broadcast programs.

In such a case, the common receiver causes four IP streams output from the demodulation device to be input to the System on Chip (SoC). Thus, four interfaces (I/F) are needed to address the four IP streams.

Meanwhile, in the reception apparatus 20 of FIG. 3, a single interface (I/F) is implemented between the demodulation section 211 as a demodulation device and the processing section 212 as a System on Chip (SoC).

In this implementation, PLP information including PLP_IDs is added to ALP packets on the side of the demodulation section 211. This allows the processing section 212 to identify which PLP each of the ALP packets input from the demodulation section 211 via the single interface (I/F) belongs to on the basis of the PLP_IDs obtained from the ALP packets.

(ALP Packet Output Timing)

Figure 4:
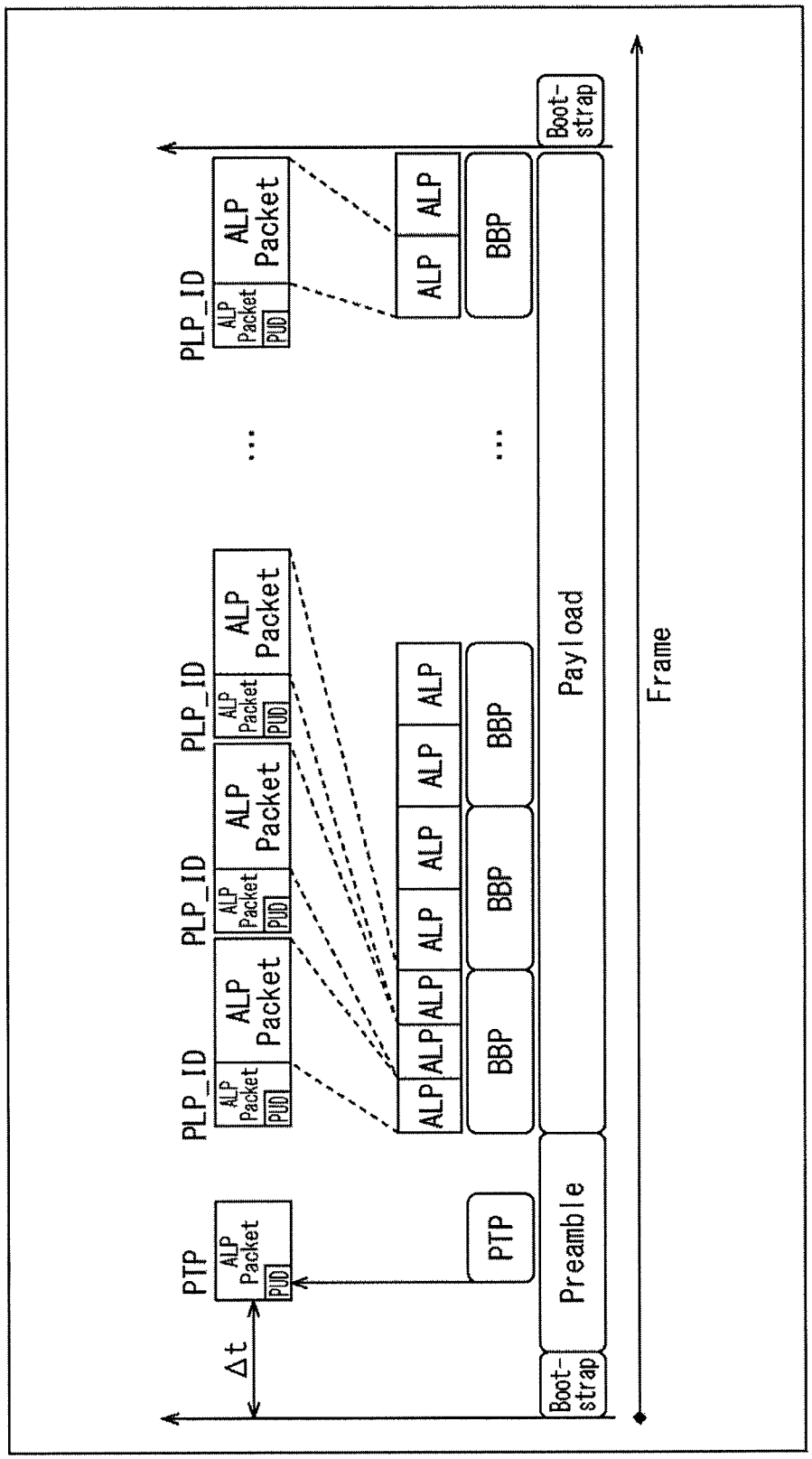
FIG. 4 is a timing diagram depicting an output timing example of ALP packets that are output via a single interface.
Figure 5:
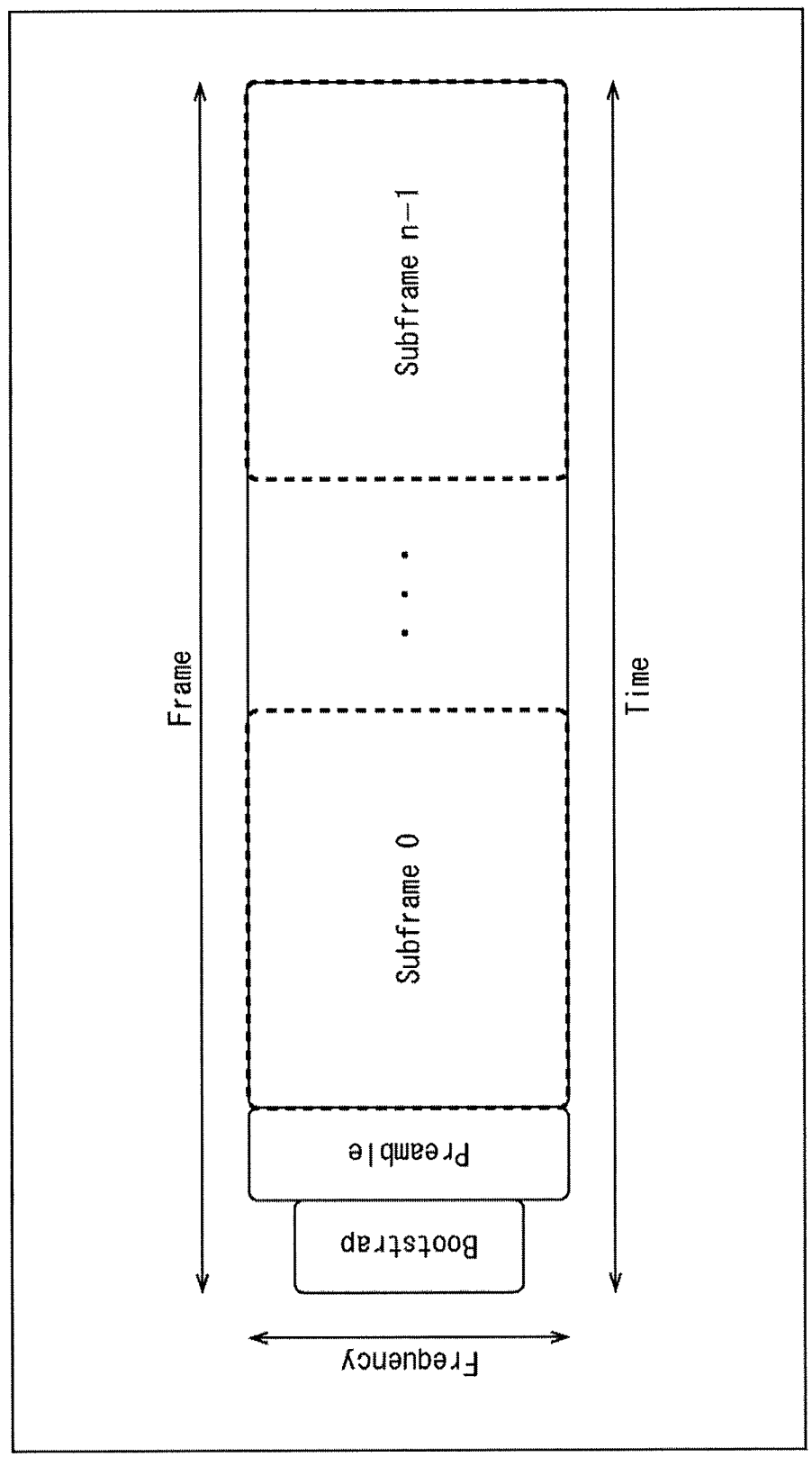
FIG. 5 is a schematic diagram depicting a typical structure of a physical layer frame.
Figure 6:
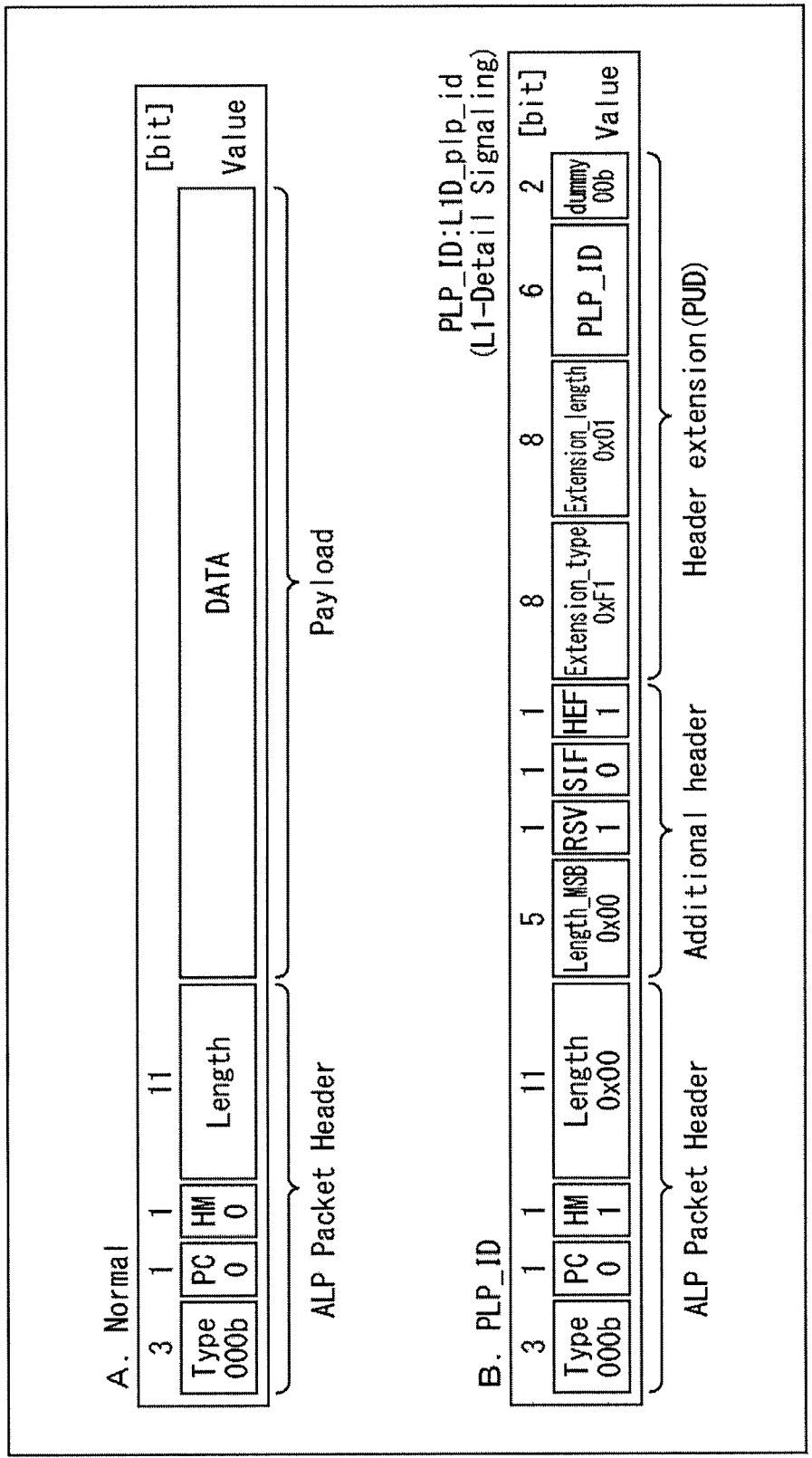
FIG. 6 is a schematic diagram depicting a typical structure of an ALP packet.

Explained next with reference to FIGS. 4 to 6 is the output timing of ALP packets processed by the reception apparatus 20.

FIG. 4 illustrates the timing of ALP packets being output from the demodulation section 211 to the processing section 212 through a single interface (I/F) in the reception apparatus 20. In FIG. 4, the horizontal direction denotes time and the vertical direction represents the data processed and obtained from frames and packets in different layers.

In FIG. 4, the data in the lowest layer is a physical layer frame. For example, the physical layer frame stipulated by ATSC 3.0 includes a bootstrap, a preamble, and a payload.

The preamble may include physical layer signaling such as L1B signaling (L1-basic signaling) and L1D signaling (L1-detail signaling). In this example, PTP (Precision Time Protocol) information is arranged in the preamble as time information.

Here, FIG. 5 depicts a typical structure of the physical layer frame stipulated by ATSC 3.0. In the physical layer frame, the payload (data) is arranged in a subframe. When the physical layer frame is to be processed, the bootstrap and the preamble are first acquired, which allows the subsequent subframe to be obtained.

In the case where two or more subframes are included, it is possible to change modulation parameters such as FFT size, guard interval length, and pilot pattern for each of the subframes.

Returning to the explanation of FIG. 4, the physical layer frame is processed by the frame processing section 231 and by the FEC processing section 232 in the demodulation section 211 of the reception apparatus 20. One or multiple BB packets (Baseband Packets, also referred to as BBPs hereunder) are thus extracted from the subframe.

Also in the demodulation section 211, the demodulation multiplexer 233 processes BB packets and extracts one or multiple ALP packets therefrom. At this point, the demodulation multiplexer 233 adds PLP information including PLP_IDs to the ALP packets.

In this manner, the PLP_IDs are added to the ALP packets output from the demodulation section 211 to the processing section 212 via the single interface (I/F). On the basis of the PLP_ID added to each ALP packet, the processing section 212 identifies the PLP each of the ALP packets input from the demodulation section 211 through the single interface (I/F) belongs to.

A structure of the ALP packet is explained below with reference to FIG. 6.

Subfigure A in FIG. 6 depicts a normal ALP packet structure. In Subfigure A of FIG. 6, a normal ALP packet includes an ALP header (ALP Packet Header) and a payload.

The ALP header is headed by a three-bit Type field. Set in the Type field is information regarding the type of the data arranged in the payload of the ALP packet.

In the ALP header, the Type field is followed by a one-bit PC (Payload Configuration) field. In the case where the PC field is set to "0," single packet mode is selected in accordance with a one-bit HM (Header Mode) field next to the PC field. An 11-bit Length field and an ALP extension header (Additional header) are arranged in the ALP header.

In the case of the normal ALP packet, the HM field is set to "0." In the ALP header, the 11-bit Length field is arranged next to the HM field. Also in the normal ALP packet, the payload is arranged next to the ALP header.

Subfigure B in FIG. 6 depicts a structure of an ALP packet in which a PLP_ID is added to the ALP extension header (the packet will also be referred to as the PLP_ID-added ALP packet hereunder).

In the PLP_ID-added ALP packet, a three-bit Type field, a one-bit PC field, and a one-bit HM field are arranged in the ALP header, the HM field having "1" set therein. With "1" set in the HM field, the ALP extension header (Additional header) is arranged next to the 11-bit Length field.

The ALP extension header (Additional header) includes a five-bit Length MSB field, a one-bit RSV (reserved) field, a one-bit SIF (Sub-stream Identifier Flag) field, and a one-bit HEF (Header Extension Flag) field.

The Length MSB field denotes in bytes the most significant bit (MSB) of the total payload length in the ALP packet. When combined with the least significant bit (LSB) indicated by the 11-bit Length field in the ALP header, the Length MSB field provides the total payload length.

The SIF field is a flag that indicates whether or not an Optional header for sub-stream identification is arranged. In the case where the SIF field is set to "0," that means the Optional header is not arranged.

The HEF field is a flag that indicates whether there is an optional header extension. In the case where the HEF field is set to "1," a header extension is provided. In the ALP header of the PLP_ID-added ALP packet in Subfigure B of FIG. 6, a three-byte header extension is provided with respect to the ALP extension header.

The header extension includes an eight-bit Extension_type field, an eight-bit Extension_length field, a six-bit PLP_ID field, and two-bit dummy data (dummy). Since this example has the six-bit PLP_ID field arranged as Private User Data (PUD), the type and length values corresponding to this arrangement are set in the Extension_type field and in the Extension_length field, respectively.

As the PLP_ID field, there is provided a six-bit L1D_plp_id field stipulated by the L1D signaling (L1-Detail Signaling) under ATSC 3.0, for example. The L1D signaling is detailed in the NPL 2 cited below. The ALP packet structure is detailed in the NPL 3 cited below.

[NPL 2]

ATSC Standard: Physical Layer Protocol (A/322)

[NPL 3]

ATSC Standard: Link-Layer Protocol (A/330)

(1) Method of Adding to a First Packet in the Same PLP (Timing of Adding the PLP_ID)

Figure 7:
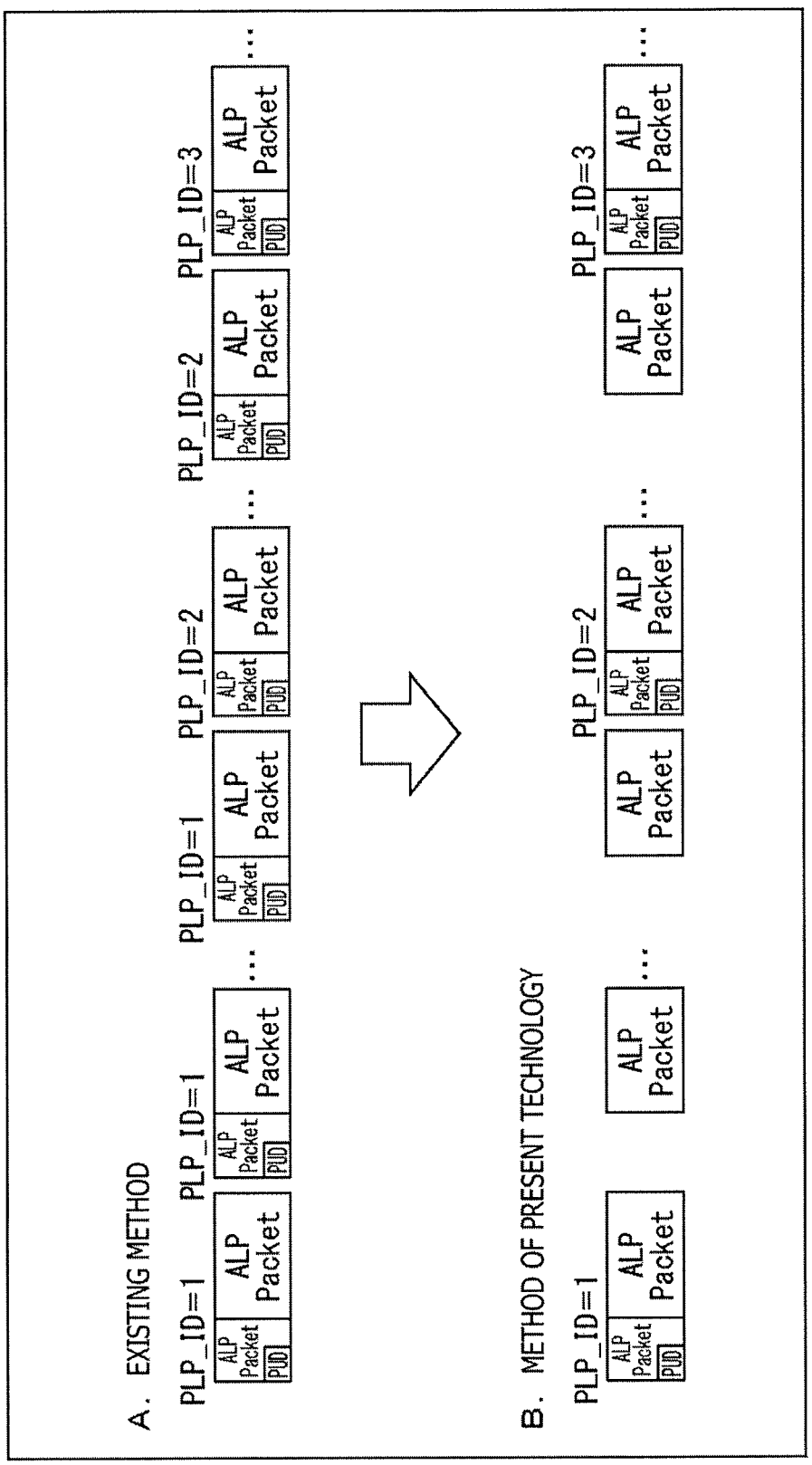
FIG. 7 is a schematic diagram depicting a timing example of adding PLP_IDs to ALP packets that are output via a single interface.

FIG. 7 is a schematic diagram depicting a timing example of adding PLP_IDs to ALP packets that are output via a single interface (I/F).

Here, for comparison purposes, Subfigure A in FIG. 7 depicts the timing of adding PLP_IDs under the existing method, and Subfigure B in FIG. 7 illustrates the timing of adding PLP_IDs under the method of the present technology.

Under the existing method, as depicted in Subfigure A of FIG. 7, a PLP_ID is added to each ALP packet by use of the private user data (PUD) in the header extension. That is, under the existing method, the PLP_IDs are added to all ALP packets.

Because a PLP_ID made up of six-byte information is added to every ALP packet, there is an increase in the transmission rate through the single interface (I/F) between the demodulation section 211 and the processing section 212. For example, in a case where six-byte-long ALP packets each added with the PLP_ID are continued, the transmission rate in the case where the PLP_IDs are added is doubled.

In view of the above circumstances, the method of the present technology proposes techniques for suppressing the increase in the transmission rate through such a single interface (I/F). That is, under the method of the present technology, in a case where ALP packets with the same PLP_ID are to be continued, a PLP_ID is added only to the first ALP packet, with no PLP_ID added to the subsequent ALP packets.

For example, as illustrated in Subfigure B of FIG. 7, the PLP_ID is added only to the first ALP packet of the ALP packets obtained continuously from the PLP with PLP_ID=1 by use of the private user data (PUD) in the header extension. Likewise, the PLP_ID is added only to the first ALP packet of the ALP packets acquired continuously from the PLP with PLP_ID=2 or from the PLP with PLP_ID=3.

In the manner described above, the PLP_ID (PLP_ID=1) is added only to the first ALP packet of the ALP packets obtained consecutively from the same PLP (with PLP_ID=1) on the side of the demodulation section 211 in the reception apparatus 20.

The processing section 212, for its part, processes a group of the packets ranging from the ALP packet to which a PLP_ID (PLP_ID=1) is added to the ALP packet immediately preceding the ALP packet to which another PLP_ID (PLP_ID=2) is added, as the ALP packets belonging to the same PLP (with PLP_ID=1).

In this manner, it is sufficient that a minimum of PLP_IDs is added to specific ALP packets. This makes it possible to suppress the increase in the transmission rate through the single interface (I/F) between the demodulation section 211 and the processing section 212. As a result, implementation of the circuit on the receiving side is facilitated.

In the case of time division multiplexing (TDM) method, as with the physical layer frame depicted in FIG. 5, signals are obtained for each PLP. That means the demodulation multiplexer 233 in the demodulation section 211 can acquire consecutive ALP packets for each PLP.

In another example, even under the method of time division multiplexing (TDM) method such as frequency division multiplexing (FDM) method or layered division multiplexing (LDM) method, a buffer memory disposed in the demodulation multiplexer 233 of the demodulation section 211 may record the signals obtained from different PLPs. It is sufficient that the demodulation multiplexer 233 then rearranges these signals into a continuous ALP packet stream for each PLP.

Incidentally, the above-described method of adding PLP_IDs to ALP packets is only an example. Any one of diverse methods may be adopted to add PLP_IDs. For example, whereas it was explained above that the PLP_ID is added outside the ALP packet, the PLP_ID may alternatively be added inside the ALP packet. In another example, the PLP_ID may be added to the head, to the end, or to an intermediate point of the ALP packet instead of being integrated with the ALP packet.

In a further example, the PLP_ID may be a two-bit relative ID replacing the six-bit absolute ID. In a yet further example, the packet to which the PLP_ID packet is added may be some other packet such as an IP packet or a BB packet instead of the ALP packet.

Figure 8:
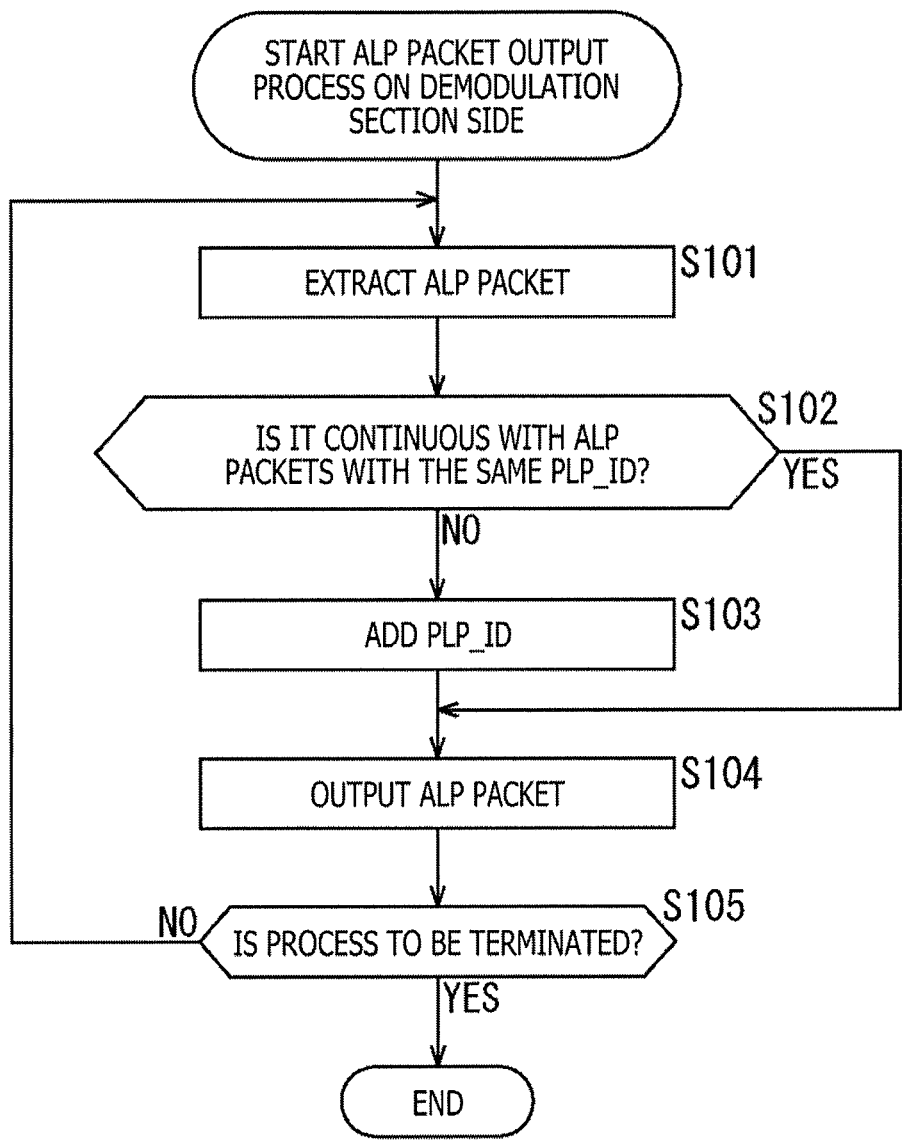
FIG. 8 is a flowchart explaining the flow of an ALP packet output process on the side of a demodulation section.
Figure 9:
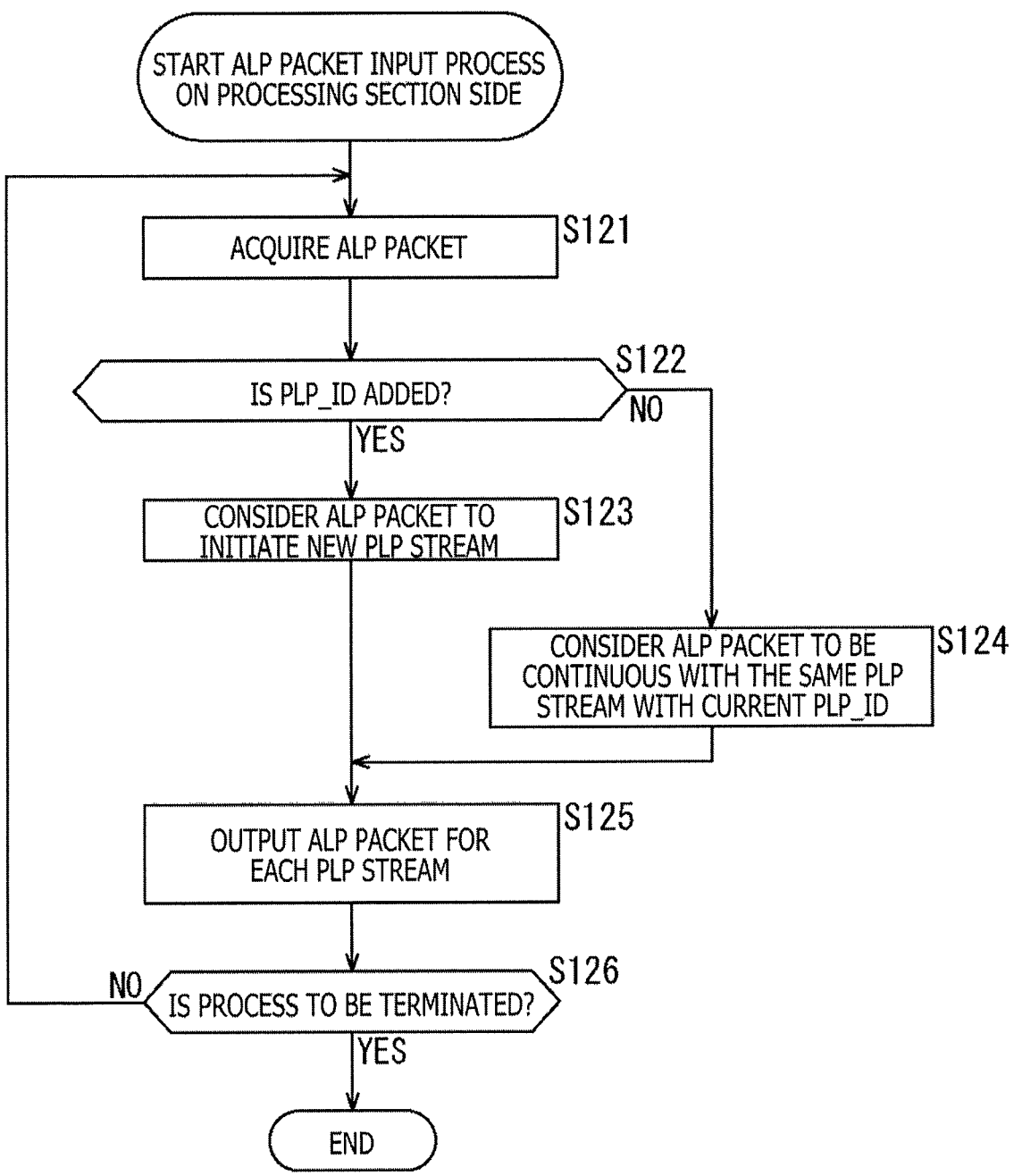
FIG. 9 is a flowchart explaining the flow of an ALP packet input process on the side of a processing section.

Explained next with reference to the flowcharts of FIGS. 8 and 9 are details of ALP packet input/output processes performed on the receiving side.

(ALP Packet Output Process)

Explained first with reference to the flowchart of FIG. 8 is the flow of an ALP packet output process on the demodulation section side performed by the demodulation section 211 of the reception apparatus 20.

In step S101, the demodulation multiplexer 233 extracts an ALP packet by processing a BBP stream input thereto.

In step S102, the demodulation multiplexer 233 determines whether the ALP packet extracted in the process in step S101 is continuous with ALP packets with the same PLP_ID.

In a case where it is determined in step S102 that the ALP packet is not continuous with ALP packets with the same PLP_ID, i.e., that the ALP packet is the first of the ALP packets in a given PLP, the process is proceeded to step S103.

In step S103, the demodulation multiplexer 233 adds a PLP_ID to the first ALP packet in a given PLP using the private user data (PUD) in the header extension. After the PLP_ID is added to the first ALP packet in the process in step S103, the process is proceeded to step S104.

In a case where it is determined in step S102 that the ALP packet is continuous with ALP packets with the same PLP_ID, i.e., that the ALP packet is a second or subsequent ALP packet in a given PLP, the process in step S103 is skipped and the process is proceeded to step S104. That means no PLP_ID is added to a second or subsequent ALP packet in a given PLP.

In step S104, the demodulation multiplexer 233 of the demodulation section 211 outputs the ALP packet to the processing section 212 via a single interface (I/F). That is, the ALP packet output from the demodulation multiplexer 233 is added with the PLP_ID if the packet is a first ALP packet in a given PLP, but is not added with the PLP_ID if the packet is a second or subsequent ALP packet in the PLP.

In step S105, it is determined whether or not to terminate the process on ALP packets. In a case where it is determined in step S105 that the process on ALP packets is not to be terminated, the process is returned to step S101 and the subsequent processes are repeated.

Whereas each PLP is identified with PLP_ID=1, 2, 3, . . . , for example, the first ALP packet in the PLP with PLP_ID=1 is added with PLP_ID=1 and the second and subsequent ALP packets are not added with any PLP_ID.

Likewise, in the PLP with PLP_ID=2, only the first ALP packet is added with PLP_ID=2; in the PLP with PLP_ID=3, only the first ALP packet is added with PLP_ID=3. The explanations involved here are repetitive and will be omitted hereunder. The process applies likewise to PLP_ID=4 and subsequent PLP_IDs.

On the other hand, in a case where it is determined in step S105 that the process on ALP packets is to be terminated, the ALP packet output process on the demodulation section side in FIG. 8 is brought to an end.

The flow of the ALP packet output process on the demodulation section side has thus been described above.

(ALP Packet Input Process)

Explained next with reference to the flowchart of FIG. 9 is the flow of an ALP packet input process on the processing section side performed by the processing section 212 of the reception apparatus 20.

In step S121, the demultiplexer 241 acquires an ALP packet input thereto from the demodulation section 211 via a single interface (I/F).

In step S122, the demultiplexer 241 determines whether a PLP_ID is added to the private user data (PUD) in the header extension of the ALP packet acquired in step S121.

In a case where it is determined in step S122 that the PLP_ID is added to the ALP packet, the process is proceeded to step S123. In step S123, the demultiplexer 241 considers the ALP packet targeted for the determination in step S122 to initiate a new PLP stream corresponding to the added PLP_ID.

In a case where it is determined in step S122 that no PLP_ID is added to the ALP packet, the process is proceeded to step S124. In step S124, the demultiplexer 241 considers the ALP packet targeted for the determination in step S122 to be continuous with the same PLP stream with the current PLP_ID.

That is, on the side of the demodulation section 211, the first ALP packet in a given PLP is added with PLP_ID, whereas a second and subsequent ALP packets are not added with any PLP_ID. Thus, the processing section 212 can consider the packets ranging from the PLP_ID-added ALP packet to the ALP packet immediately preceding the next PLP_ID-added ALP packet, to be the continuous ALP packets with the same PLP_ID.

For example, in the PLP with PLP_ID=1, the first PLP packet is added with PLP_ID=1, so that this ALP packet is regarded as initiating a new PLP stream with PLP_ID=1 (S123). Thereafter, a second and subsequent ALP packets in the PLP with PLP_ID=1 are not added with any PLP_ID, so that these ALP packets are regarded as continuous with the same PLP stream with the current PLP_ID=1 (S124).

Upon completion of step S123 or S124, the process is proceeded to step S125.

In step S125, the demultiplexer 241 outputs the ALP packet to the decapsulation sections 242 for each PLP stream. For example, an ALP packet continuous with the PLP stream with PLP_ID=1 is output to the decapsulation section 242-1 among the decapsulation sections 242-1 to 242-4.

In step S126, it is determined whether or not to terminate the process on ALP packets. In a case where it is determined in step S126 that the process on ALP packets is not to be terminated, the process is returned to step S121 and the subsequent processes are repeated.

For example, in the PLP with PLP_ID=2, the first ALP packet is added with PLP_ID=2, so that this ALP packet is regarded as initiating a new PLP stream (different from the PLP stream with the current PLP_ID) (S123). A second and subsequent ALP packets are not added with any PLP_ID, so that these ALP packets are regarded as continuous with the same PLP stream with PLP_ID=2 (S124). An ALP packet continuous with the PLP stream with PLP_ID=2 is output to the decapsulation section 242-2 (S125).

The process applies likewise to PLP_ID=3, PLP_ID=4, and so on, the explanation thereof being omitted hereunder to avoid repetitiveness. When an ALP packet added with a PLP_ID is acquired, the packet is regarded as initiating a new PLP stream. For example, an ALP packet continuous with the PLP stream with PLP_ID=3 is output to the decapsulation section 242-3, and an ALP packet continuous with the PLP stream with PLP_ID=4 is output to the decapsulation section 242-4.

On the other hand, in a case where it is determined in step S126 that the process on ALP packets is to be terminated, the ALP packet input process on the processing section side in FIG. 9 is brought to an end.

The flow of the ALP packet input process on the processing section side has thus been described above.

(2) Method of Adding to Segmentation Packets

Meanwhile, under ATSC 3.0, segmentation packets and concatenation packets are stipulated as ALP packets. What follows is an explanation of how to handle the segmentation packets when PLP_IDs are to be added thereto.

(ALP Packet Structure)

Figure 10:
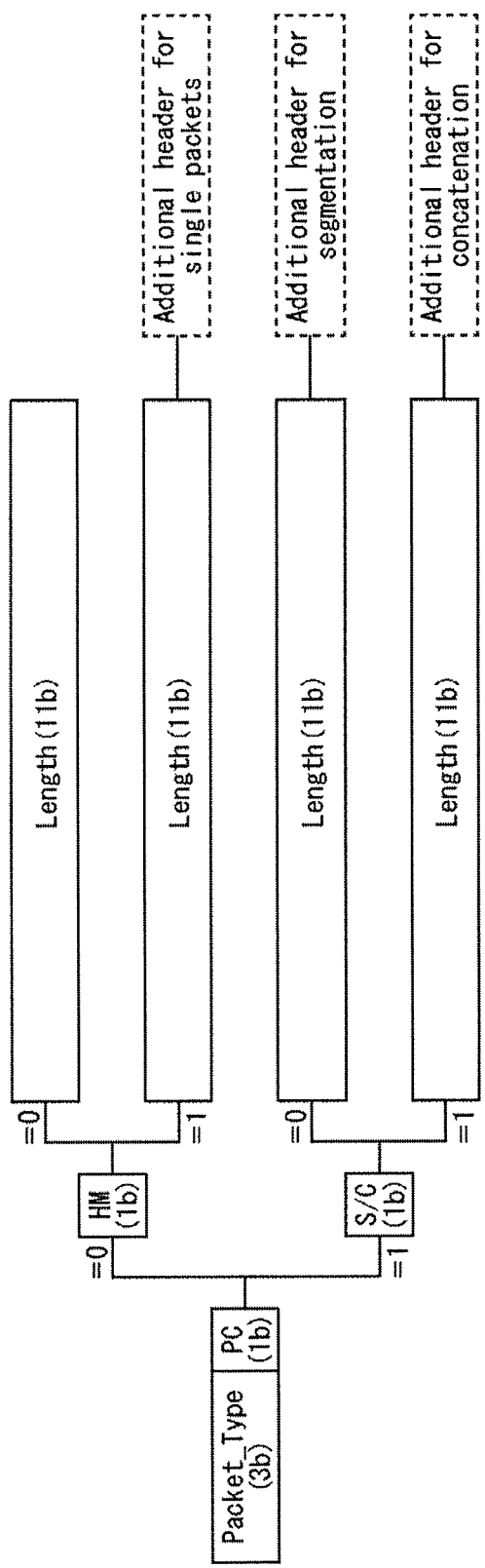
FIG. 10 is a schematic diagram depicting another typical structure of the ALP packet.

FIG. 10 is a schematic diagram depicting a typical structure of the ALP packet.

The ALP packet in FIG. 10 is headed by a three-bit Type field and a one-bit PC (Payload Configuration) field. In the case where the PC field is set to "0," Single packet mode is selected in accordance with a one-bit HM (Header Mode) field next to the PC field. An 11-bit Length field and an extension header (Additional header) are arranged in the ALP header, as discussed above.

On the other hand, in a case where the PC field is set to "1," Segmentation mode or Concatenation mode is selected in accordance with a one-bit S/C (Segmentation/Concatenation) field next to the PC field. An 11-bit Length field and an extension header (Additional header) are arranged in the ALP header.

FIG. 11 is a schematic diagram depicting an example of the syntax of the ALP header. Incidentally, segmentation packets and concatenation packets are detailed in the NPL 3, particularly in "FIG. 5.2 Structure of Base Header for ALP packet encapsulation" and in "Table 5.1 Header Syntax for ALP Packet Encapsulation."

(Timing of Adding PLP_IDs)

Figure 12:
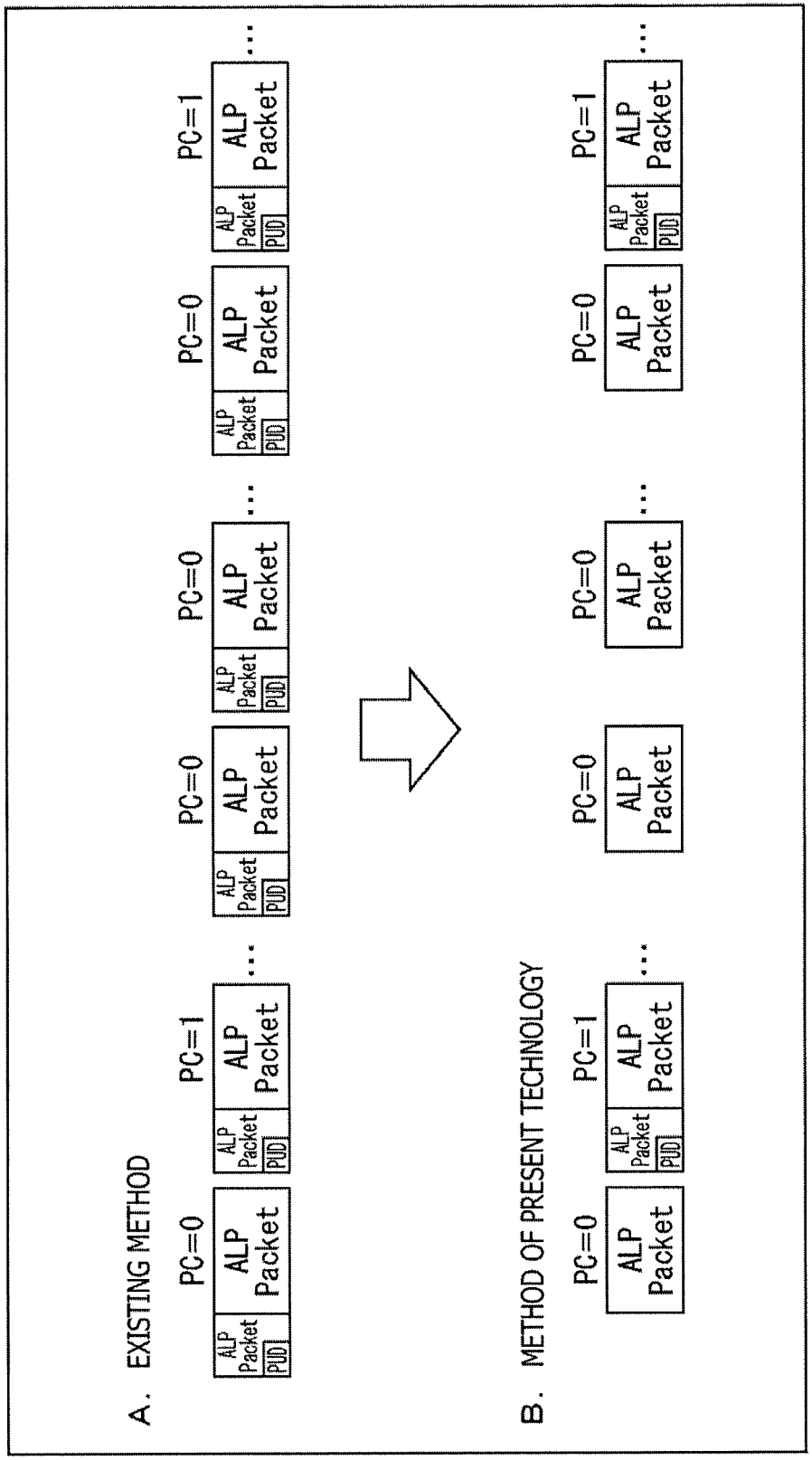
FIG. 12 is a schematic diagram depicting another timing example of adding PLP_IDs to ALP packets that are output via a single interface.

FIG. 12 is a schematic diagram depicting a timing example of adding PLP_IDs to ALP packets that are output via a single interface (I/F).

Here, for comparison purposes, Subfigure A in FIG. 12 depicts the timing of adding PLP_IDs under the existing method, and Subfigure B in FIG. 12 illustrates the timing of adding PLP_IDs under the method of the present technology.

Under the existing method, as depicted in Subfigure A of FIG. 12, PLP_IDs are added to all ALP packets regardless of the value in the PC (Payload Configuration) field of the ALP header, i.e., irrespective of the ALP packet type such as that of single packet mode, segmentation mode, or concatenation mode.

Thus, with the six-byte-information PLP_ID added to every ALP packet, there is an increase in the transmission rate through the single interface (I/F) between the demodulation section 211 and the processing section 212 as discussed above.

In the case where segmentation mode is selected with the PC field set to "1" in the ALP header, the IP packet is divided into segments, some of which are transmitted. The divided IP packet is regarded as an ALP packet (segmentation packet).

In the case where concatenation mode is selected with the PC field set to "1" in the ALP header, multiple IP packets are connected (concatenated) before being transmitted. The connected IP packets are regarded as an ALP packet (concatenation packet).

In this case, even if the PLP_ID can be identified by the information included in the ALP packet (e.g., by CID (Context Identifier), etc.), when the ALP packet is divided into segments, the information for identification remains only in the first ALP packet segment (segmentation packet) out of the divided ALP packet segments (segmentation packets).

In such a case, if things are left as they are, there is no way of identifying the PLP_ID of the divided AP packet segments (segmentation packets) other than that of the first ALP packet (segmentation packet).

Thus, under the method of the present technology, in a case where the PC field is set to "1" and the S/H field is set to "0" in the ALP header, the PLP_ID is added to the ALP packet (segmentation packet). That is, according to the method of the present technology, the PLP_ID is added only to the ALP packet (segmentation packet) with PC=1 and no PLP_ID is added to the ALP packet with PC=0.

For example, as illustrated in Subfigure B of FIG. 12, of the ALP packets with PC=0 and PC=1, only the ALP packet with PC=1 is added with the PLP_ID using the private user data (PUD) in the header extension. This makes it possible to identify the PLP_ID of not only the first ALP packet (segmentation packet) out of the divided ALP packet segments (segmentation packets) but also the other ALP packet segments (segmentation packets) in reference to the private user data (PUD) in the header extension.

Whereas the above explanation has centered on the segmentation packets, the PLP_ID can be added likewise to the concatenation packets by use of the private user data (PUD) in the header extension.

3. Second Embodiment (1) Method of Mapping to CIDs
(Example of IP Data Flow)

Figure 13:
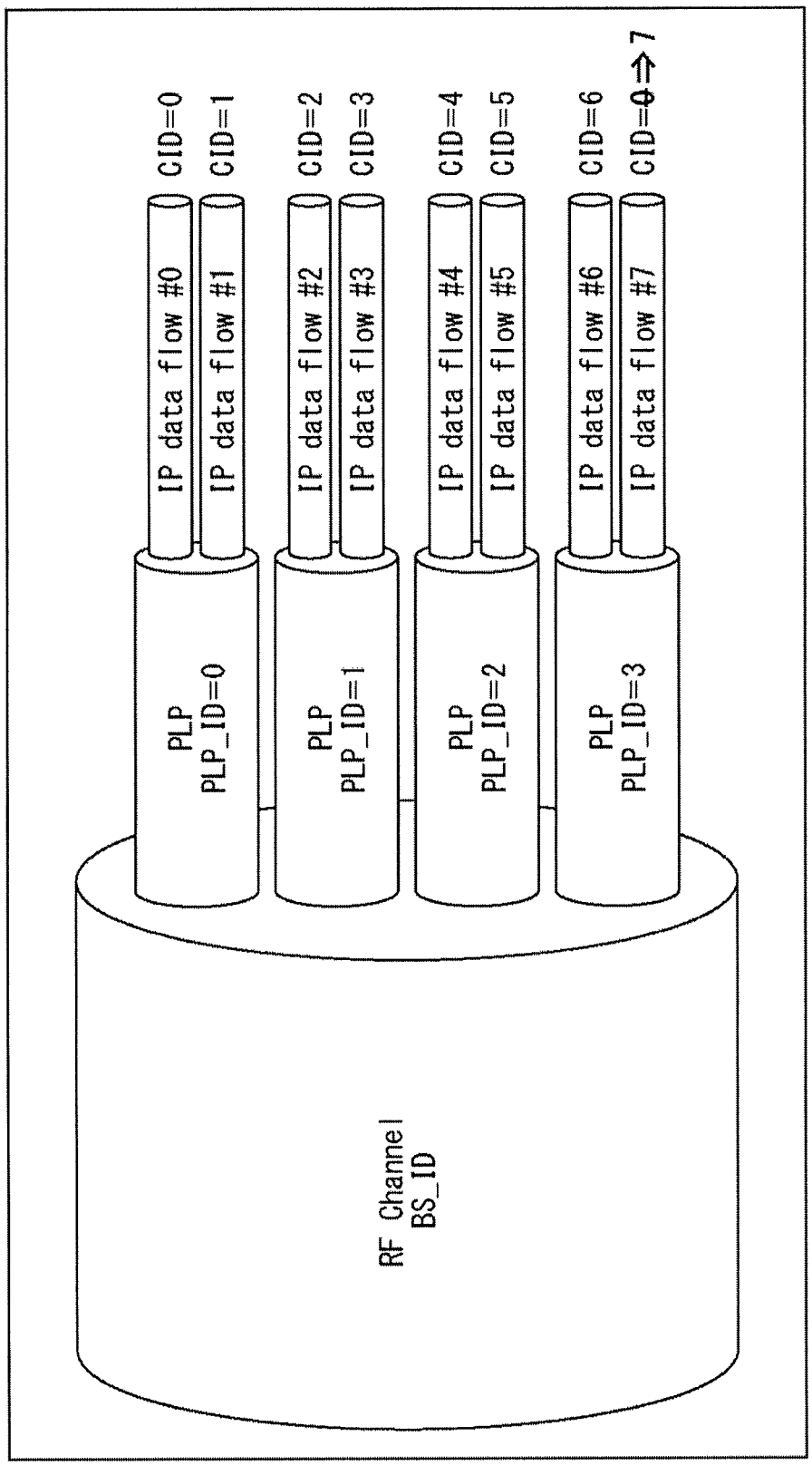
FIG. 13 is a schematic diagram depicting a typical configuration of an IP data flow.

FIG. 13 is a schematic diagram depicting a typical structure of data transmission by an IP transmission method.

In FIG. 13, over an RF channel identified by a broadcast stream ID (BS ID), one or multiple PLPs (Physical Layer Pipes) transmit streams that include diverse types of packets.

In the example of FIG. 13, four PLPs with PLP_IDs=0, 1, 2 and 3 constitute one service. In the case where the IP transmission method is adopted, each PLP transmits the stream for each IP data flow. Here, the IP data flow refers to an aggregate of IP packets of which the IP address and the port number are the same. Each IP data flow is identified by a CID (Context Identifier).

In the example of FIG. 13, the PLP with PLP_ID=0 has two IP data flows #0 and #1 transmitting the streams. Likewise, the PLP with PLP_ID=1 has two IP data flows #2 and #3 transmitting the streams; the PLP with PLP_ID=2 has two IP data flows #4 and #5 transmitting the streams; and the PLP with PLP_ID=3 has two IP data flows #6 and #7 transmitting the streams.

A CID is assigned to each of these IP data flows. In the case where the CIDs overlap between transmission packets transmitted through different PLPs (e.g., header-compressed IP packets, to be discussed later), it is necessary to identify each IP data flow using a PLP_ID.

In the example of FIG. 13, the IP data flow #0 with CID=0 is transmitted through the PLP with PLP_ID=0, and the IP data flow #7 with CID=0 is transmitted through the PLP with PLP_ID=3. In this case, the CIDs each being 0 overlap with one another, so that the IP data flows need to be identified using PLP_ID=0 and PLP_ID=3.

In other words, if the CIDs do not overlap in the same service, the IP data flows may be identified without adding PLP_IDs to the transmission packets.

In the example of FIG. 13, the PLP with PLP_ID=3 may have the CID of the IP data flow #7 changed from 0 to 7. This causes the CIDs to have a unique value each in the service constituted by four PLPs, which allows the IP data flows to be identified without recourse to PLP_IDs.

Incidentally, the IP packets transmitted by the IP data flows have a large overhead because each IP packet has diverse information included in its header. In view of this, RFC 3095 worked out by the IETF (The Internet Engineering Task Force) stipulates RoHC (Robust Header Compression) as the technique for compressing the IP packet header to permit efficient IP packet transmission.

RoHC involves transmitting a transmission packet that includes all header information regarding the IP header and UDP header (i.e., a complete transmission packet), followed by transmission packets in which the header information is constituted by the differences from the header information in the preceding complete transmission packet.

That is, RoHC is a method that separates the header information in the IP header and UDP header making up IP packets including UDP packets into static information (SC: Static Chain) and dynamic information (DC: Dynamic Chain), the static information (SC) being kept from repetitive transmission so as to reduce the number of the transmissions involved and thereby to compress the header information.

The static information (SC) here refers to header information of which predetermined content remains unchanged or of which the content is kept intact throughout the ongoing situation. On the other hand, the dynamic information (DC) refers to flexible information of which predetermined content varies with the situation or of which the content may be selected depending on the situation.

(IR Packet Structure)

Figure 14:
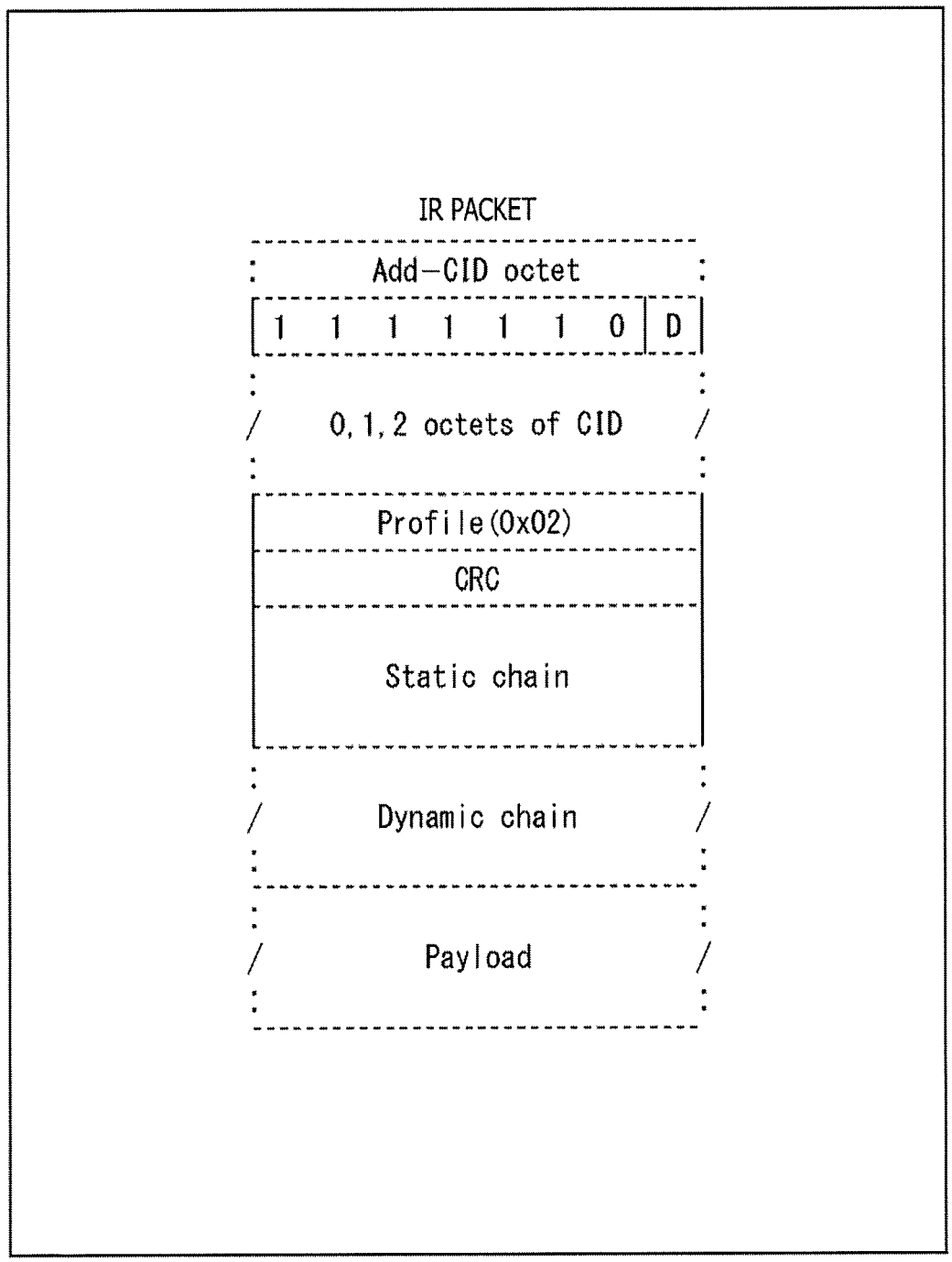
FIG. 14 is a schematic diagram depicting a typical structure of an IR packet.

FIG. 14 is a schematic diagram depicting a typical structure of a transmission packet of which the packet type is an IR packet.

In the header of the transmission packet in FIG. 14, an Add-CID octet is arranged in one byte (bits 1 to 8) from the start. A PLP_ID and a CID are set to the Add-CID octet. A detailed structure of the Add-CID octet will be described later with reference to FIG. 17.

In the next one byte (bits 9 to 16), seven bits from the start are set fixedly to "1111110," with the last one bit being set with a flag (D) indicative of whether there is dynamic information (DC). The next two bytes (bits 17 to 24 and 25 to 32) provide an extension CID area (large CID) for use as needed in a case where the CID is made up of four or more bits.

In the next one byte (bits 33 to 40), an eight-bit profile is set. In the transmission packet in FIG. 14, a profile "0x0002" is set. In the next one byte (bits 41 to 48), an eight-bit error-detecting code (CRC: Cyclic Redundancy Check) is set. The error-detecting code (CRC) is followed by static information (SC) and dynamic information (DC) of which the length is variable.

The header of the transmission packet of which the packet type is the IR packet is structured as described above. The header is followed by a payload.

(IR-DYN Packet Structure)

Figure 15:
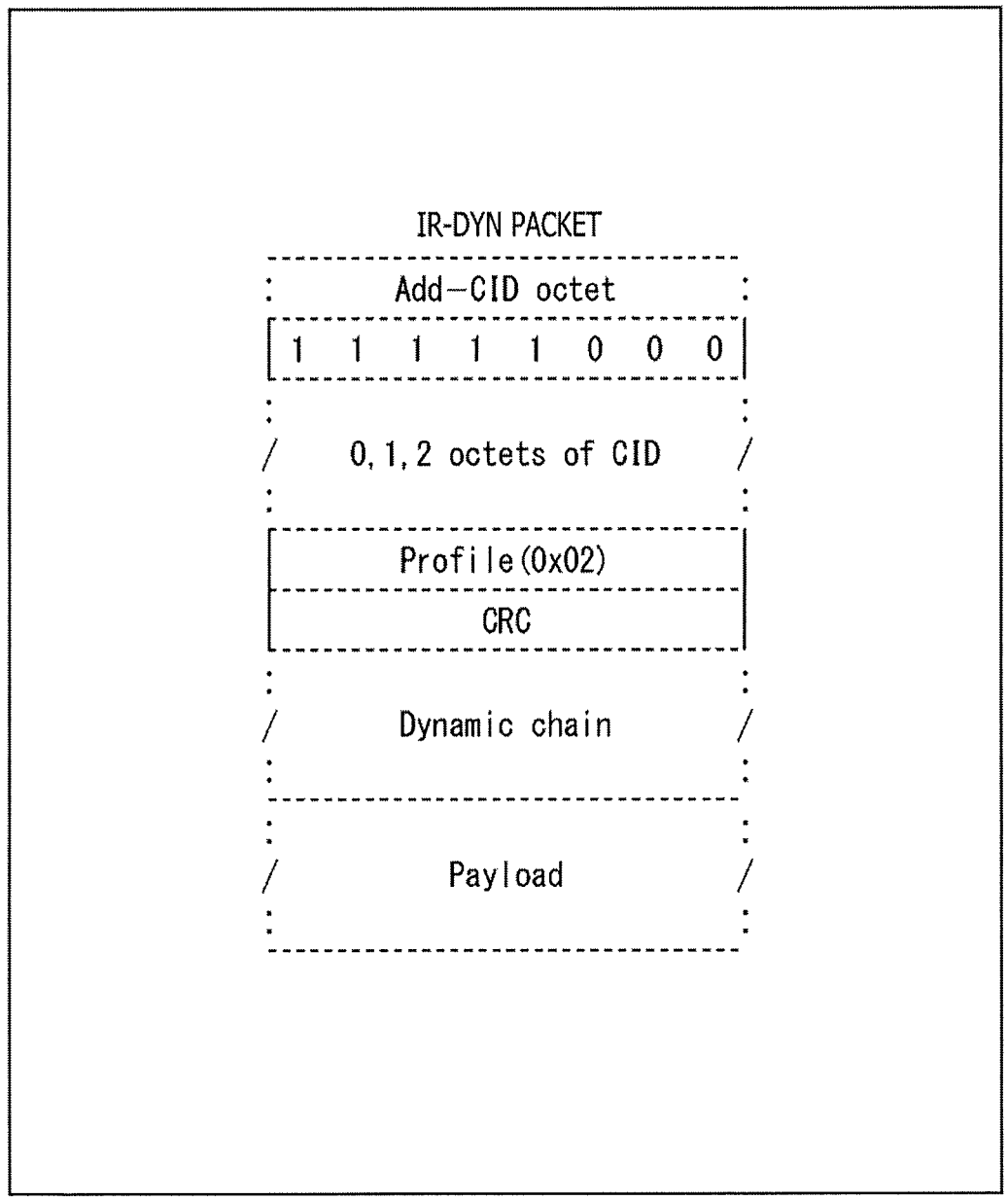
FIG. 15 is a schematic diagram depicting a typical structure of an IR-DYN packet.

FIG. 15 is a schematic diagram depicting a typical structure of a transmission packet of which the packet type is an IR-DYN packet.

In the header of the transmission packet in FIG. 15, an Add-CID octet is arranged in one byte (bits 1 to 8) from the start. A PLP_ID and a CID are set to the Add-CID octet. A detailed structure of the Add-CID octet will be described later with reference to FIG. 17.

The next one byte (bits 9 to 16) is set fixedly with "11111000." The next two bytes (bits 17 to 24 and 25 to 32) provide an extension CID area (large CID) for use as needed in a case where the CID is made up of four or more bits.

In the next one byte (bits 33 to 40), an eight-bit profile is set. In the transmission packet in FIG. 15, a profile "0x0002" is set. In the next one byte (bits 41 to 48), an eight-bit error-detecting code (CRC) is set. The error-detecting code (CRC) is followed by dynamic information (DC) of which the length is variable.

The header of the transmission packet of which the packet type is the IR-DYN packet is structured as described above. The header is followed by a payload.

(UO-0 Packet Structure)

FIG. 16 is a schematic diagram depicting typical structures of a transmission packet of which the packet type is a UO-0 packet. It is to be noted that in FIG. 16, Subfigure A depicts the structure applicable in a case where the CID is 15 or smaller and Subfigure B illustrates the structure applicable in a case where the CID is 16 or larger.

In the header of the transmission packet in Subfigure A of FIG. 16, an Add-CID octet is arranged in one byte (bits 1 to 8) from the start.

In the next one byte (bits 9 to 16), the first bit is set fixedly with "0." The next four bits are set with an SN (Sequence Number), and the next three bits are set with an error-detecting code (CRC).

In the header of the transmission packet in Subfigure B of FIG. 16, the first bit of one byte from the start (bits 1 to 8)

is set fixedly with "0." The next four bits are set with an SN (Sequence Number), and the next three bits are set with an error-detecting code (CRC).

The next two bytes (bits 9 to 16 and 17 to 24) provide an extension CID area (large CID) for use as needed.

The RoHC packet types depicted in FIGS. 14 to 16 are only examples. For example, RoHC stipulates other packet types such as UO-1 and UOR-2 packets. The RoHC packet types are detailed in the proposal of RoHC (RObust Header Compression (ROHC): Framework and four profiles: RTP, UDP, ESP, and uncompressed).

According to the present technology, the PLP to which a transmission packet such as an IR packet, an IR-DYN packet, or a UO-0 packet belongs is identified by the Add-CID octet area (also referred to as CID area (small CID) hereunder) and the extension CID area (large CID) in the header which include the CID area information as mapping information mapped to the PLP_ID of the PLP of interest.

Explained below is a first CID handling method through a fourth CID handling method, each being the method of identifying the PLP to which a transmission packet belongs by use of the CID area information (mapping information).

(1-1) First CID Handling Method (Add-CID Octet Structure)

Figure 17:
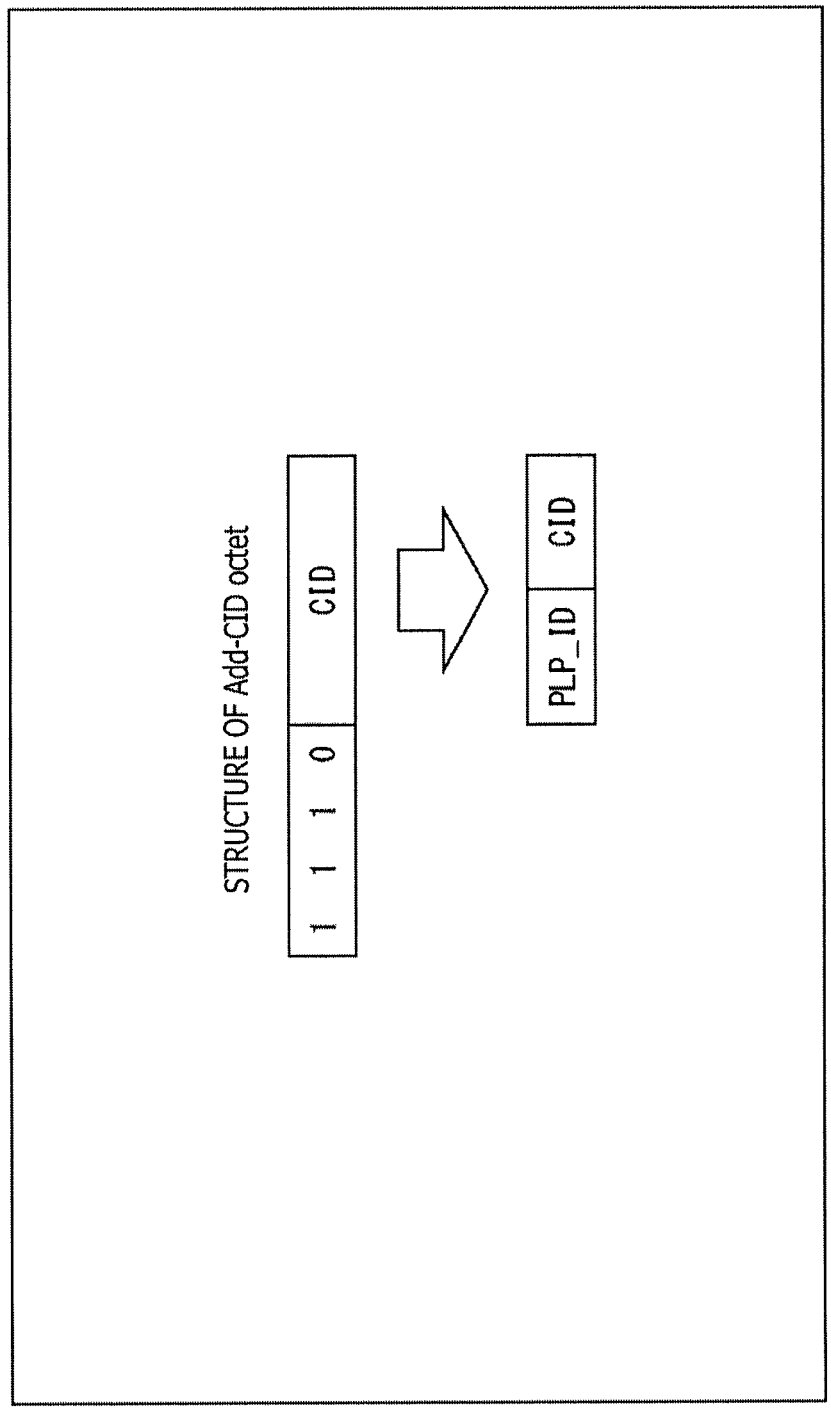
FIG. 17 is a schematic diagram depicting a typical structure of an Add-CID octet.

FIG. 17 is a schematic diagram depicting a typical structure of an Add-CID octet.

RoHC stipulates that in the header of the transmission packet depicted in FIG. 14, in FIG. 15, and in Subfigure A of FIG. 16, one byte from the start (bits 1 to 8) is set with "1110CID" as the Add-CID octet, i.e., that the high four bits are set fixedly with "1110" and the low four bits with a CID.

Meanwhile, in the case where the first CID handling method is adopted in conjunction with the present technology, in the CID area of the Add-CID octet, the high two bits out of the low four bits are assigned a PLP_ID and the remaining two bits are assigned a CID. The two-bit PLP_ID thus assigned makes it possible to identify up to four PLPs in the same service.

The bit assignments in the CID area are only an example. In another example, the bits to be assigned may be varied depending on the number of PLPs to be identified.

Figure 18:
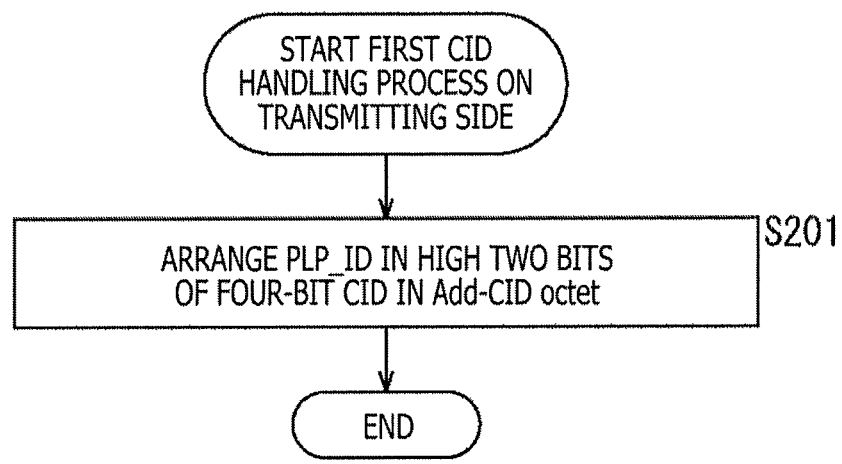
FIG. 18 is a flowchart explaining the flow of a first CID handling process on the transmitting side.
Figure 19:
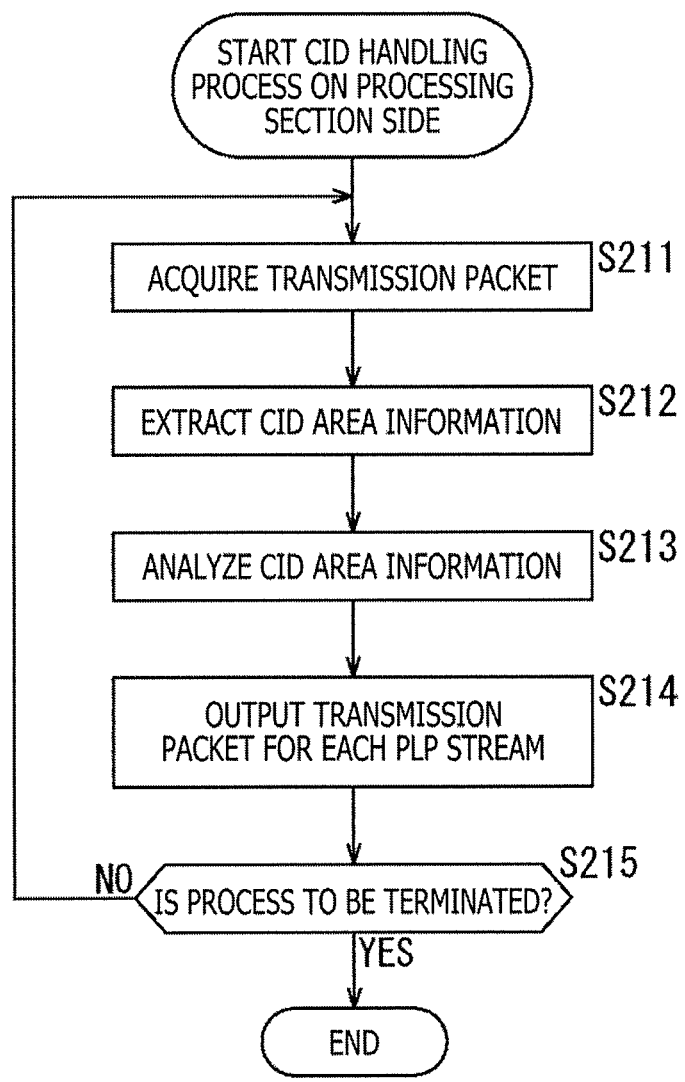
FIG. 19 is a flowchart explaining the flow of a CID handling process on the processing section side.

Explained next with reference to the flowcharts of FIGS. 18 and 19 are details of the CID handling processes performed on the transmitting side and on the receiving side.

(First CID Handling Process on the Transmitting Side)

Explained first with reference to the flowchart of FIG. 18 is the flow of the first CID handling process on the transmitting side performed by the transmission apparatus 10.

In step S201, the modulation section 112 processes a transmission packet input thereto so as to arrange a PLP_ID in the high two bits of the four-bit CID area in the Add-CID octet of the packet header.

That is, a two-bit PLP_ID is included, along with a CID of the low two bits, as the CID area information arranged in the CID area. The transmission packet thus obtained is subjected to necessary processing such as modulation, before being transmitted as a broadcast signal resulting from the processing.

The flow of the first CID handling process on the transmitting side has thus been described above.

(CID Handling Process on the Processing Section Side)

Explained next with reference to the flowchart of FIG. 19 is the flow of the CID handling process on the processing section side performed by the reception apparatus 20.

Incidentally, the process outlined in FIG. 19 is a process carried out by the processing section 212 in the reception apparatus 20. Upstream of this process is another process performed by the demodulation section 211. That is, the broadcast signal received from the transmission apparatus 10 is subjected to necessary processing such as demodulation by the demodulation section 211. An ALP packet resulting from that processing is output to the processing section 212 via a single interface (I/F).

In step S211, the demultiplexer 241 acquires a transmission packet by processing an ALP packet input thereto. The transmission packet is an IR packet, an IR-DYN packet, or a UO-0 packet, for example.

In step S212, the demultiplexer 241 extracts CID area information from the header of the transmission packet (i.e., from the CID area of the Add-CID octet in the header) acquired in the process in step S211.

In step S213, the demultiplexer 241 analyzes the CID area information extracted in step S212.

Here, according to the first CID handling method, the PLP_ID is arranged in the high two bits out of the four bits in the CID area as the CID area information obtained from the CID area of the header in the transmission packet. Thus, the PLP stream corresponding to the PLP_ID is identified for each transmission packet targeted to be processed.

In step S214, the demultiplexer 241 outputs the transmission packet for each PLP stream on the basis of the analysis result obtained in step S213.

In step S215, it is determined whether or not to terminate the process on transmission packets. In a case where it is determined in step S215 that the process on transmission packets is not to be terminated, the process is returned to step S211 and the subsequent steps are repeated.

For example, a transmission packet for the PLP stream with PLP_ID=1 is output to a first process stream such as the decapsulation section 242-1. A transmission packet for the PLP stream with PLP_ID=2 is output to a second process stream such as the decapsulation section 242-2. Likewise, transmission packets for the PLP streams with PLP_IDs=3, 4, etc., are output to a third process stream, a fourth process stream, etc., corresponding to the PLP streams involved.

On the other hand, in a case where it is determined in step S215 that the process on transmission packets is to be terminated, the CID handling process on the processing section side in FIG. 19 is brought to an end.

The flow of the CID handling process on the processing section side has thus been described above.

(1-2) Second CID Handling Method

Under RoHC, the extension CID area (large CID) is allocated in the header of the transmission packet depicted in FIG. 14, in FIG. 15 and in Subfigure B of FIG. 16. Thus, in the case where the second CID handling method is adopted in conjunction with the present technology, the PLP_ID is arranged in the extension CID area.

In that case, two bits are allocated for the PLP_ID, which allows up to four PLPs to be identified in the same service. As opposed to the first CID handling method discussed above, the PLP_ID is not assigned to the CID area in the one-byte Add-CID octet from the start. This enables the Add-CID octet to be used as stipulated by RoHC. It is to be noted, however, that the number of bits for the PLP_ID is not limited to 2; any number of bits may be allocated for the PLP_ID.

(Second CID Handling Process on the Transmitting Side)

Figure 20:
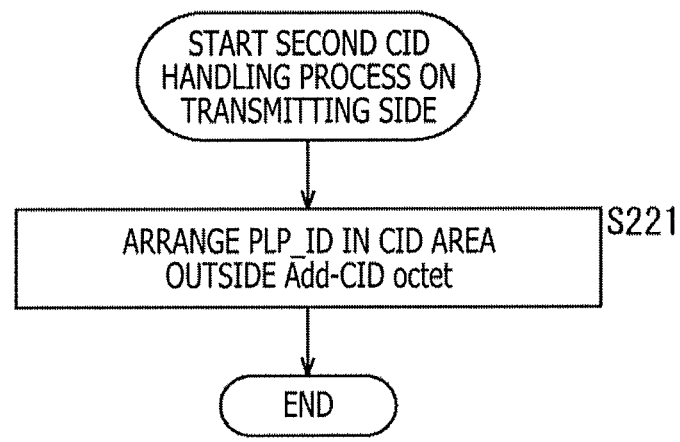
FIG. 20 is a flowchart explaining the flow of a second CID handling process on the transmitting side.

Explained below with reference to the flowchart of FIG. 20 is the flow of the second CID handling process on the transmitting side performed by the transmission apparatus 10.

In step S221, the modulation section 112 processes a transmission packet input thereto so as to arrange a two-bit PLP_ID in the extension CID area of the packet header.

This causes the PLP_ID, along with the CID of the Add-CID octet, to be included as the CID area information in the CID area and in the extension CID area. The transmission packet thus obtained is subjected to necessary processing such as modulation, before being transmitted as a broadcast signal resulting from the processing.

The flow of the second CID handling process on the transmitting side has thus been described above.

The process performed by the reception apparatus 20 in accordance with the second CID handling method is basically similar to the process in the case of the above-described first CID handling method and thus will not be discussed further in detail, except for the following differences.

That is, in the processing section 212 of the reception apparatus 20, the demultiplexer 241 obtains the PLP_ID arranged in the extension CID area as the CID area information to be acquired from the header of the transmission packet. Thus, the demultiplexer 241 can output the transmission packets for each PLP stream corresponding to the PLP_ID.

(1-3) Third CID Handling Method

Under RoHC, the CID is arranged in the CID area or in the extension CID area of the header of the transmission packet depicted in FIGS. 14, 15, and 16. In the case where the third CID handling method is adopted in conjunction with the present technology, the transmission apparatus 10 on the transmitting side manages the CIDs in such a manner that they do not overlap with one another in a single service constituted by multiple PLPs.

(Third CID Handling Process on the Transmitting Side)

Figure 21:
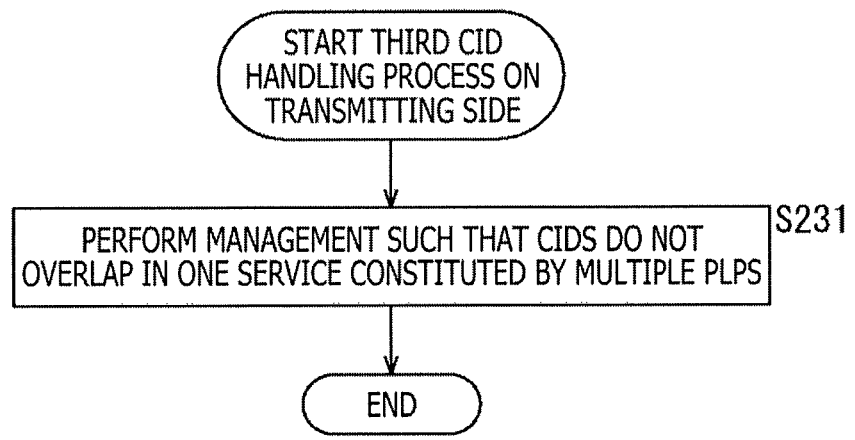
FIG. 21 is a flowchart explaining the flow of a third CID handling process on the transmitting side.

Explained below with reference to the flowchart of FIG. 21 is the flow of the third CID handling process on the transmitting side performed by the transmission apparatus 10.

In step S231, the modulation section 112 processes a transmission packet input thereto, and performs management such that when a CID is set to the CID area or to the extension CID area in the header of the packet, the CIDs do not overlap with one another in one service constituted by multiple PLPs.

In this case, for example, the modulation section 112 records a CID management table to an internal memory and, by referencing the table, manages the CIDs used in the target service in such a manner that the CIDs do not overlap with one another.

In the above-described example of FIG. 13, two IP data flows are transmitted for each of the four PLPs constituting one service (PLPs with PLP_IDs=0, 1, 2, and 3). The modulation section 112 assigns a unique CID to each of the IP data flows.

More specifically, as depicted in the example of FIG. 13, values 0 to 7 are assigned as CIDs to IP data flows #0 to #7, respectively. In this manner, each CID becomes a unique value in the service constituted by four PLPs, so that each IP data flow can be identified without recourse to the PLP_ID.

That is, the transmission apparatus 10 on the transmitting side manages CIDs in such a manner that they do not overlap with one another when included as the CID area information in the CID area or in the extension CID area of the header in the transmission packet. The transmission packet thus obtained is subjected to necessary processing such as modulation, before being transmitted as a broadcast signal resulting from the processing.

The flow of the third CID handling process on the transmitting side has thus been described above.

The process performed by the reception apparatus 20 in accordance with the third CID handling method is basically similar to the process in the case of the above-described first CID handling method and thus will not be discussed further in detail, except for the following differences.

That is, in the processing section 212 of the reception apparatus 20, the demultiplexer 241 obtains the CIDs as the CID area information from the CID area or from the extension CID area in the header of each transmission packet, the CIDs having been managed by the transmission apparatus 10 on the transmitting side so that they do not overlap with one another. This allows the demultiplexer 241 to output the transmission packets for each IP data flow stream (PLP stream) corresponding to each CID.

(1-4) Fourth CID Handling Method

Under RoHC, the CID is arranged in the CID area or in the extension CID area of the header of the transmission packet depicted in FIGS. 14, 15, and 16. In the case where the fourth CID handling method is adopted in conjunction with the present technology, the reception apparatus 20 (i.e., its demodulation section 211) on the receiving side manages CIDs in such a manner that they do not overlap with one another in a single service constituted by multiple PLPs.

(CID Handling Process on the Demodulation Section Side)

Figure 22:
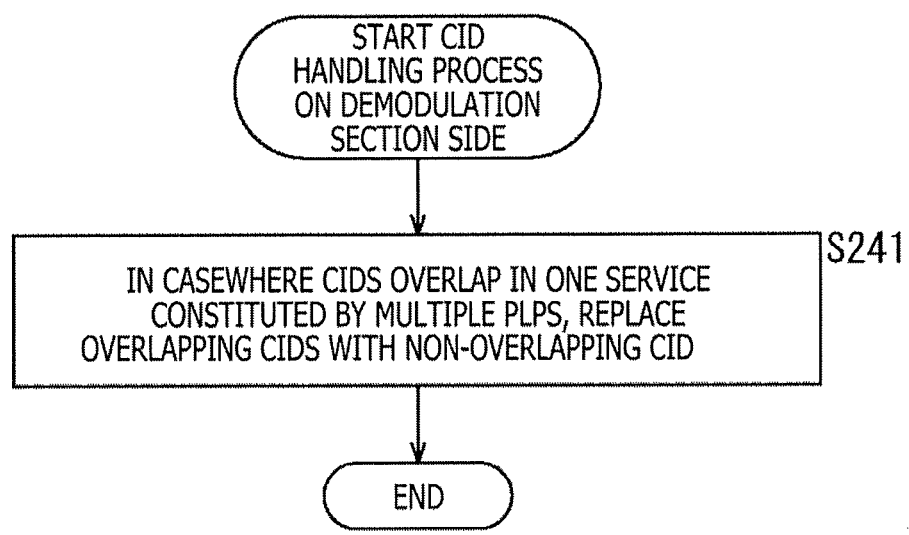
FIG. 22 is a flowchart explaining the flow of a CID handling process on the demodulation section side.

Explained below with reference to the flowchart of FIG. 22 is the flow of the CID handling process on the demodulation section side performed by the reception apparatus 20.

In step S241, the demodulation multiplexer 233 processes a transmission packet input thereto and, upon recognizing the CID set in the CID area or in the extension CID area of the packet header, manages the CIDs in such a manner that they do not overlap with one another in one service constituted by multiple PLPs.

That is, in the case where CIDs overlap with one another in one service constituted by multiple PLPs, the demodulation multiplexer 233 replaces the overlapping CIDs with a non-overlapping CID. In this case, for example, the demodulation multiplexer 233 records a CID management table to an internal memory and, by referencing the table, manages the CIDs used in the target service in such a manner that they do not overlap with one another.

In the above-described example of FIG. 13, two IP data flows are transmitted for each of the four PLPs constituting one service (PLPs with PLP_IDs=0, 1, 2, and 3). The demodulation multiplexer 233 assigns a unique CID to each of the IP data flows.

More specifically, as depicted in the example of FIG. 13, suppose that the CIDs are not managed by the transmission apparatus 10 on the transmitting side and that values 0, 1, 2, 3, 4, 5, 6, and 0 are assigned as CIDs to IP data flows #0 through #7, respectively. In such a case, the demodulation multiplexer 233 replaces the value 0 with a value 7 as the CID for IP data flow #7. As a result of this, each CID becomes a unique value in the service constituted by four PLPs, allowing the processing section 212 to identify each IP data flow without recourse to the PLP_ID.

The process performed by the processing section 212 in accordance with the fourth CID handling method is basically similar to the process in the case of the above-described first CID handling method and thus will not be discussed further in detail, except for the following differences.

That is, in the processing section 212 of the reception apparatus 20, the demultiplexer 241 obtains the CIDs as the CID area information from the CID area or from the extension CID area in the header of each transmission packet, the CIDs having been managed on the receiving side (i.e., by its demodulation section 211) so that they do not overlap with one another. This allows the demultiplexer 241 to output the transmission packets for each IP data flow stream (PLP stream) corresponding to each CID.

As described above, the CID area information is arranged as the PLP_ID mapping information in the CID area (small CID) or in the extension CID area (large CID) of the header in each transmission packet such as the IR packet. Using this CID area information enables the receiving side to identify the PLP to which each transmission packet belongs.

The information corresponding to PLP_IDs is mapped to other areas (to the CID area or extension CID area), eliminating the need for adding PLP_IDs to ALP packets, for example. This makes it possible for the reception apparatus 20 on the receiving side to suppress the increase in the transmission rate through the single interface (I/F) between the demodulation section 211 as a demodulation device on the one hand and the processing section 212 as a System on Chip (SoC) on the other hand. As a result, implementation of the circuit on the receiving side is facilitated.

As described above, under ATSC 3.0 for example, the IP transmission method involving the use of IP packets including UDP packets is adopted for transmitting data. Thus, the above-described method of mapping to CIDs can be employed. Of the broadcast methods other than under ATSC 3.0, those adopting the IP transmission method may also employ the method of mapping to CIDs.

It was explained above that the CID-related processes on the transmitting side are carried out by the modulation section 112 (processing section) (in the data processing apparatus) installed on the transmitting station side, for example. Alternatively, the CID-related processes on the transmitting side may be performed by the multiplexer 111 (processing section) (in the data processing apparatus) installed on the broadcast station side.

Furthermore, whereas ATSC 3.0 stipulates that the CID is to be up to one byte long, the present technology is not subject to such constraints. For example, there may be included the case where the CID is two bytes long.

(2) Method of Mapping to PIDs
(TS Packet Structure)

FIG. 23 is a schematic diagram depicting an example of the syntax of a TS packet.

A TS stream based on the MPEG-2 TS (Transport Stream) method is made up of TS packets. The header of the TS packet has 32 bits that include an eight-bit sync_byte, a one-bit transport_error_indicator, a one-bit payload_unit_start_indicator, a one-bit transport_priority, a 13-bit PID, a two-bit transport_scramble_control, a two-bit adaptation_field_control, and a four-bit continuity_counter.

Here, the 13-bit PID (Packet ID) is a packet identifier assigned to each TS packet under MPEG-2 TS. The packet identifier indicates what is transmitted by each TS packet.

According to the present technology, the PID area in the header of each TS packet includes PID area information as mapping information mapped to the PLP_ID of the PLP to which this TS packet belongs. Inclusion of the PID area information permits identification of the PLP to which the TS packet of interest belongs.

Explained below is a first PID handling method through a third PID handling method, each being the method of identifying the PLP to which a TS packet belongs by use of the PID area information (mapping information).

Incidentally, the method of mapping to PIDs involves processing TS streams each constituted by TS packet. Thus, the transmission apparatus 10 (FIG. 2) on the transmitting side and the reception apparatus 20 (FIG. 3) on the receiving side process the TS streams instead of the IP streams.

(2-1) First PID Handling Method
(PID Structure)

FIG. 24 is a schematic diagram depicting a typical structure of a PID.

In the header of the TS packet, 13 bits are assigned for the PID as mentioned above. In the case where the first PID handling method is adopted in conjunction with the present technology, the high two bits in the 13-bit PID are assigned a PLP_ID and the remaining 11 bits are assigned a PID. The two-bit PLP_ID thus assigned allows up to four PLPs to be identified in the same service.

Figure 25:
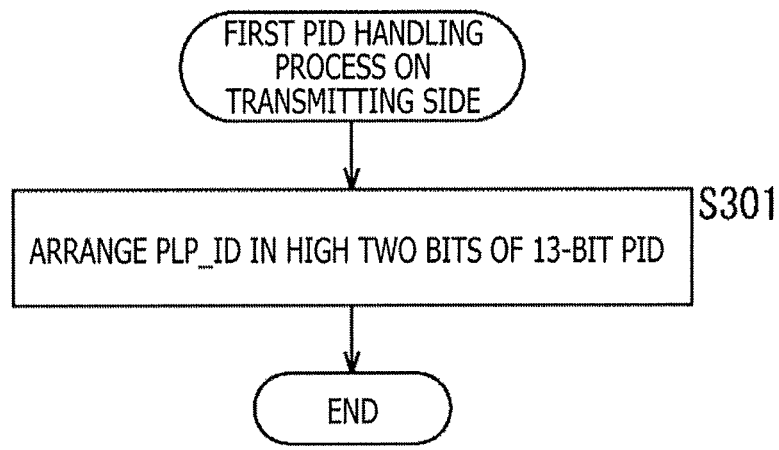
FIG. 25 is a flowchart explaining the flow of a first PID handling process on the transmitting side.
Figure 26:
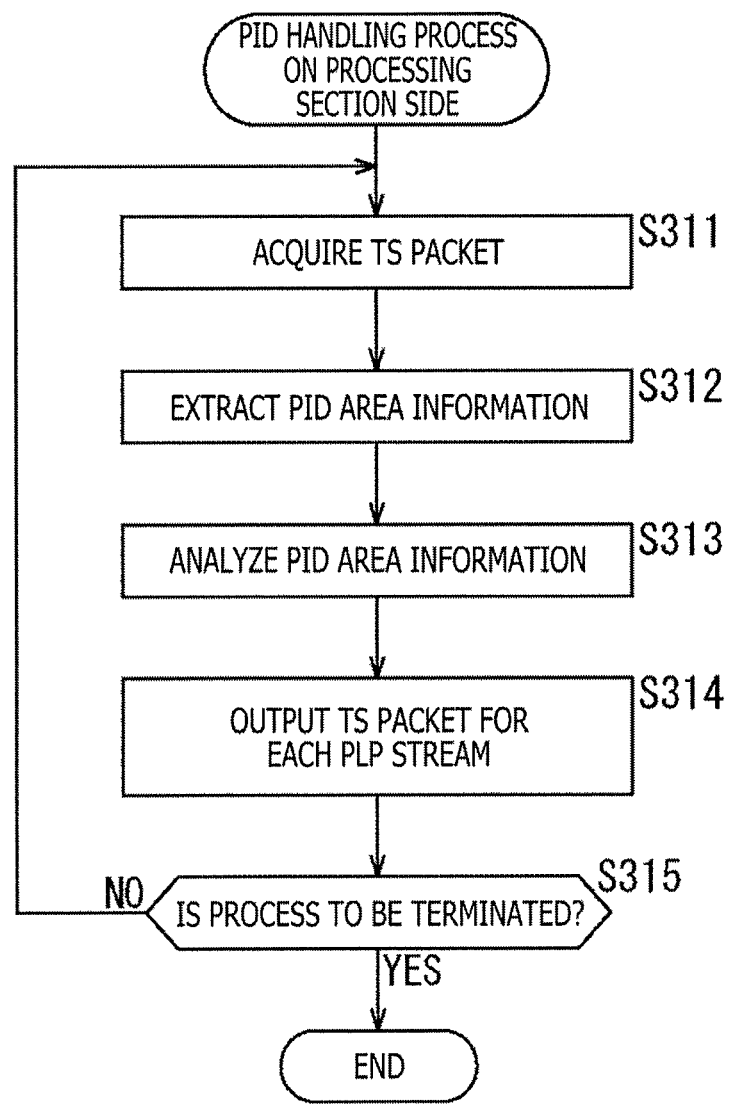
FIG. 26 is a flowchart explaining the flow of a PID handling process on the processing section side.

Explained next with reference to the flowcharts of FIGS. 25 and 26 are details of the PID handling processes performed on the transmitting side and on the receiving side.

(First PID Handling Process on the Transmitting Side)

Explained first with reference to the flowchart of FIG. 25 is the flow of the first PID handling process on the transmitting side performed by the transmission apparatus 10.

In step S301, the modulation section 112 processes a TS packet input thereto so as to arrange a PLP_ID in the high two bits of the 13-bit PID in the packet header.

In this manner, the two-bit PLP_ID is included, along with the low-11-bit PID, as the PID area information in the PID area of the header in the TS packet. The TS packet thus obtained is subjected to necessary processing such as modulation, before being transmitted as a broadcast signal resulting from the processing.

The flow of the first PID handling process on the transmitting side has thus been described above.

(PID Handling Process on the Processing Section Side)

Explained next with reference to the flowchart of FIG. 26 is the flow of the PID handling process on the processing section side performed by the reception apparatus 20.

Incidentally, the process outlined in FIG. 26 is a process carried out by the processing section 212 in the reception apparatus 20. Upstream of this process is another process performed by the demodulation section 211. That is, the broadcast signal received from the transmission apparatus 10 is subjected to necessary processing such as demodulation by the demodulation section 211. A TS packet resulting from that processing is output to the processing section 212 via a single interface (I/F).

In step S311, the demultiplexer 241 acquires a TS packet input thereto.

In step S312, the demultiplexer 241 extracts PID area information from the PID area in the header of the TS packet acquired in the process in step S311.

In step S313, the demultiplexer 241 analyzes the PID area information extracted in step S312.

Here, according to the first PID handling method, the PLP_ID is arranged in the high two bits of the 13-bit information as the PID area information obtained from the PID area of the header in the TS packet. Thus, the PLP stream corresponding to this PLP_ID is identified for each TS packet targeted to be processed.

In step S314, the demultiplexer 241 outputs the TS packet for each PLP stream on the basis of the analysis result obtained in step S313.

In step S315, it is determined whether or not to terminate the process on TS packets. In a case where it is determined in step S315 that the process on TS packets is not to be terminated, the process is returned to step S311 and the subsequent processes are repeated.

For example, a TS packet for the PLP stream with PLP_ID=1 is output to the first process stream such as the decapsulation section 242-1. A TS packet for the PLP stream with PLP_ID=2 is output to the second process stream such as the decapsulation section 242-2. Likewise, TS packets for the PLP streams with PLP_IDs=3, 4, etc., are output respectively to the third process stream, the fourth process stream, etc., corresponding to the PLP streams involved.

On the other hand, in a case where it is determined in step S315 that the process on TS packets is to be terminated, the PID handling process on the processing section side in FIG. 26 is brought to an end.

The flow of the PID handling process on the processing section side has thus been described above.

(2-2) Second PID Handling Method

Under the MPEG2-TS method, the 13-bit PID is arranged in the PID area of the header in the TS packet depicted in FIG. 23. In the case where the second PID handling method is adopted in conjunction with the present technology, the transmission apparatus 10 on the transmitting side manages PIDs in such a manner that they do not overlap with one another in a single service constituted by multiple PLPs.

(Second PID Handling Process on the Transmitting Side)

Figure 27:
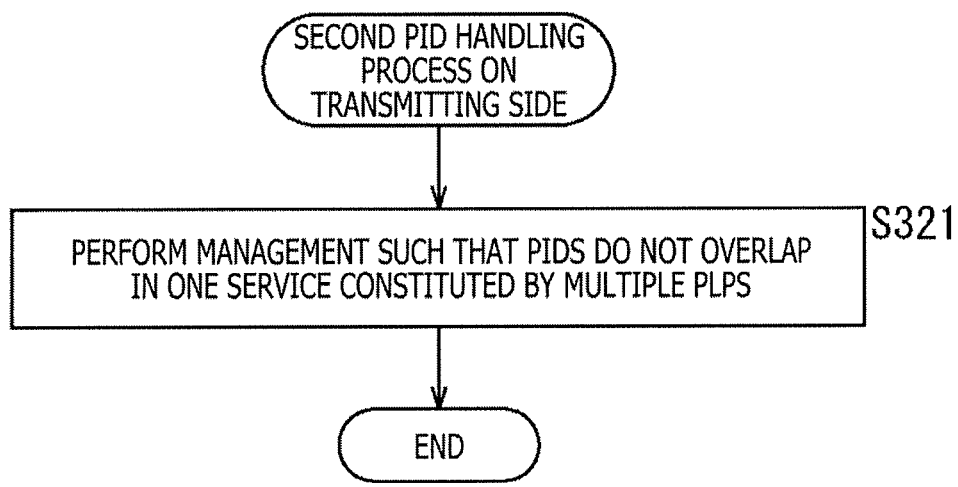
FIG. 27 is a flowchart explaining the flow of a second PID handling process on the transmitting side.

Explained next with reference to the flowchart of FIG. 27 is the flow of the second PID handling process on the transmitting side performed by the transmission apparatus 10.

In step S321, the modulation section 112 processes a TS packet input thereto, and performs management such that when a PID is set to the PID area of the packet header, PIDs do not overlap with one another in one service constituted by multiple PLPs.

In this case, for example, the modulation section 112 records a PID management table to an internal memory and, by referencing the table, manages the PIDs used in the target service in such a manner that they do not overlap with one another.

In this manner, the transmission apparatus 10 on the transmitting side manages the PIDs in such a manner that they do not overlap with one another when included as the PID area information in the PID area of the header in the TS packet. The TS packet thus obtained is subjected to necessary processing such as modulation, before being transmitted as a broadcast signal resulting from the processing.

The flow of the second PID handling process on the transmitting side has thus been described above.

The process performed by the reception apparatus 20 in accordance with the second PID handling method is basically similar to the process in the case of the above-described first PID handling method and thus will not be discussed further in detail, except for the following differences.

That is, in the processing section 212 of the reception apparatus 20, the demultiplexer 241 obtains the PIDs as the PID area information from the PID area in the header of each TS packet, the PIDs having been managed by the transmission apparatus 10 on the transmitting side so that they do not overlap with one another. This allows the demultiplexer 241 to output the TS packets for each PLP stream corresponding to each PID.

(2-3) Third PID Handling Method

Under the MPEG2-TS method, the 13-bit PID is arranged in the PID area of the header in the TS packet depicted in FIG. 23. In the case where the third PID handling method is adopted in conjunction with the present technology, the reception apparatus 20 (i.e., its demodulation section 211) on the receiving side manages PIDs in such a manner that they do not overlap with one another in a single service constituted by multiple PLPs.

(PID Handling Process on the Demodulation Section Side)

Figure 28:
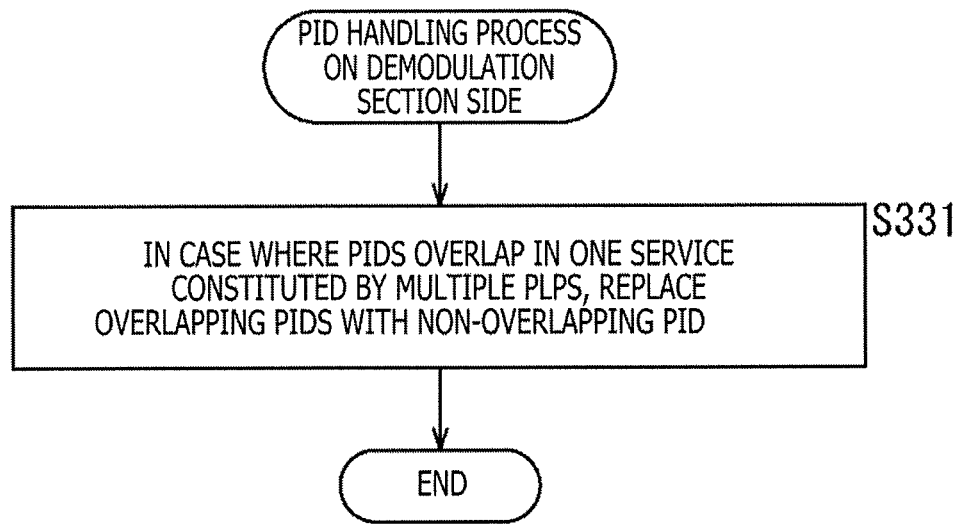
FIG. 28 is a flowchart explaining the flow of a PID handling process on the demodulation section side.

Explained below with reference to the flowchart of FIG. 28 is the flow of the PID handling process on the demodulation section side performed by the reception apparatus 20.

In step S331, the demodulation multiplexer 233 processes a TS packet input thereto and, upon recognizing the PID set in the PID area of the packet header, manages the PIDs in such a manner that they do not overlap with one another in one service constituted by multiple PLPs.

That is, in the case where PIDs overlap with one another in one service constituted by multiple PLPs, the demodulation multiplexer 233 replaces the overlapping PIDs with a non-overlapping PID. In this case, for example, the demodulation multiplexer 233 records a PID management table to an internal memory and, by referencing the table, manages the PIDs used in the target service in such a manner that they do not overlap with one another.

The flow of the PID handling process on the demodulation section side has thus been described above.

The process performed by the processing section 212 in accordance with the third PID handling method is basically similar to the process in the case of the above-described first PID handling method and thus will not be discussed further in detail, except for the following differences.

That is, in the processing section 212 of the reception apparatus 20, the demultiplexer 241 obtains the PIDs as the PID area information from the PID area in the header of each transmission packet, the PIDs having been managed on the receiving side (i.e., by its demodulation section 211) so that they do not overlap with one another. This allows the demultiplexer 241 to output the TS packets for each PLP stream corresponding to each PID.

As described above, the PID area information is arranged as the PLP_ID mapping information in the PID area of the header in each TS packet. Using this PID area information enables the receiving side to identify the PLP to which each TS packet belongs.

The information corresponding to PLP_IDs is mapped to other areas (to the PID area), eliminating the need for adding PLP_IDs to ALP packets, for example. This makes it possible for the reception apparatus 20 on the receiving side to suppress the increase in the transmission rate through the single interface (I/F) between the demodulation section 211 as a demodulation device on the one hand and the processing section 212 as a System on Chip (SoC) on the other hand. As a result, implementation of the circuit on the receiving side is facilitated.

It was explained above that the PID-related processes on the transmitting side are carried out by the modulation section 112 (processing section) (in the data processing apparatus) installed on the transmitting station side, for example. Alternatively, the PID-related processes on the transmitting side may be performed by the multiplexer 111 (processing section) (in the data processing apparatus) installed on the broadcast station side.

4. Variations (Applicability to Other Broadcast Methods)

In the foregoing paragraphs, ATSC (ATSC 3.0 in particular) adopted primarily in the United States, etc., has been explained as a typical digital broadcast standard to which the present technology may be applied. Alternatively, the present technology may be applied to the ISDB (Integrated Services Digital Broadcasting) standard adopted mainly in Japan or to the DVB (Digital Video Broadcasting) standard adopted in European countries. Furthermore, as described above, the present technology may be employed in conjunction with not only the IP transmission method but also the MPEG2-TS method or some other method as the data transmission method, for example.

Also, the present technology may be applied to digital broadcast standards regulating not only digital terrestrial broadcasts but also satellite broadcasts that use Broadcasting Satellites (BS) or Communications Satellites (CS) and cable broadcasts such as cable TV (CATV).

(Applicability to Methods Other than Broadcast Methods)

The present technology may also be applied to predetermined standards (standards other than the digital broadcast standards) stipulated to regulate the uses of transmission paths other than the broadcast networks, such as communication lines (communication networks) including the Internet and telephone networks. In such cases, the transmission lines such as the Internet and telephone networks are used as the transmission path 30 for the broadcast system 1 (FIG. 1). Servers on the Internet may be used as the transmission apparatus 10. Such communication servers and the reception apparatus 20 conduct bidirectional communications therebetween via the transmission path 30 (communication lines).

(Other Configurations on the Receiving Side)

Explained in the foregoing paragraphs were the configurations in which a single interface (I/F) provides connection between the demodulation section 211 as a demodulation device on the one hand and the processing section 212 as a System on Chip (SoC) on the other hand in the reception apparatus 20. Alternatively, there may be two or more interfaces (I/F) if they are fewer than the number of IP streams corresponding to PLPs that are input to the demodulation multiplexer 233 in the demodulation section 211.

That is, the number of interfaces (I/F) between the demodulation section 211 and the processing section 212 is to be either one or smaller than the number of PLPs. In the case where, for example, multiple processing sections 212 are provided for one demodulation section 211 in the reception apparatus 20, multiple interfaces (I/F) are provided.

5. Computer Configuration

Figure 29:
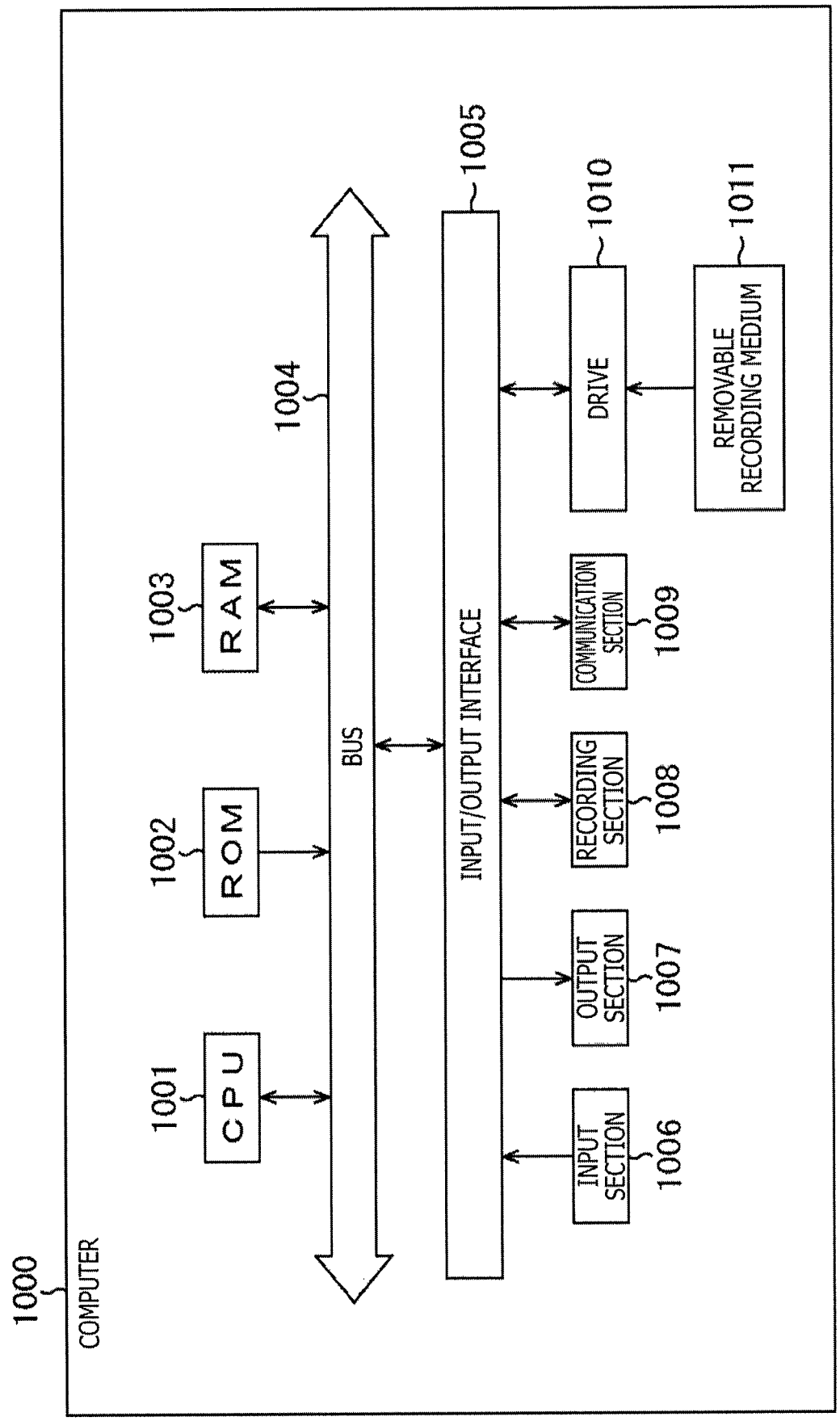
FIG. 29 is a block diagram depicting a typical configuration of a computer.

The series of steps and processes described above may be executed either by hardware or by software. In a case where the series of processing is to be carried out by software, the programs constituting the software are installed into a suitable computer. FIG. 29 depicts a typical configuration of hardware of a computer that executes the above-described series of processing using programs.

In a computer 1000, a CPU (Central Processing Unit) 1001, a ROM (Read Only Memory) 1002, and a RAM (Random Access Memory) 1003 are interconnected via a bus 1004. The bus 1004 is further connected with an input/output interface 1005. The input/output interface 1005 is connected with an input section 1006, an output section 1007, a recording section 1008, a communication section 1009, and a drive 1010.

The input section 1006 includes a keyboard, a mouse, and a microphone, for example. The output section 1007 includes a display and speakers, for example. The recording section 1008 includes a hard disk or a nonvolatile memory. The communication section 1009 includes a network interface. The drive 1010 drives a removable recording medium 1011 such as a magnetic disk, an optical disk, a magneto-optical disk, or a semiconductor memory.

In the computer 1000 configured as described above, the CPU 1001 performs the above-mentioned series of processing by loading appropriate programs from the ROM 1002 or from the recording section 1008 into the RAM 1003 via the input/output interface 1005 and the bus 1004 and by executing the loaded programs.

The programs to be executed by the computer 1000 (CPU 1001) may be recorded, for example, on the removable recording medium 1011 provided as package media when offered. The programs may also be offered via wired or wireless transmission media such as local area networks, the Internet, and digital satellite broadcasting.

In the computer 1000, when the removable recording medium 1011 is attached to the drive 1010, the programs may be installed into the recording section 1008 through the input/output interface 1005. Alternatively, the programs may be received by the communication section 1009 through wired or wireless transmission media before getting installed into the recording section 1008. As another alternative, the programs may be preinstalled in the ROM 1002 or in the recording section 1008.

In this specification, the processes executed by the computer in accordance with the programs need not be carried out chronologically as depicted in the flowcharts. That is, the processes performed by the computer according to the programs may include processes that are conducted parallelly or individually (e.g., parallel processes or object-oriented processes). The programs may be processed by a single computer (processor) or by multiple computers on a distributed basis.

The embodiments of the present technology are not limited to those discussed above. The embodiments may be modified or altered in diverse fashion within the scope and spirit of the present technology.

The present technology may be implemented preferably in the following configurations.

(1)

A reception apparatus including:

a demodulation section configured to demodulate packets obtained with respect to each of a plurality of PLPs (Physical Layer Pipes) included in a broadcast signal; and a processing section configured to process the packets demodulated by the demodulation section, in which the demodulation section and the processing section are connected with each other via a single interface or interfaces fewer than the number of the PLPs, the demodulation section adds identification information to a specific packet among the packets obtained with respect to each of the PLPs, the identification information identifying the PLP to which each of the packets belongs, and the processing section identifies the PLP to which belongs each of the packets input from the demodulation section via the single interface or the interfaces fewer than the number of the PLPs, on the basis of the identification information obtained from the specific packet.

(2)

The reception apparatus as stated in paragraph (1) above, in which the demodulation section adds the identification information only once to the packets obtained continuously from a same PLP.

(3)

The reception apparatus as stated in paragraph (2) above, in which the demodulation section adds the identification information to a first packet of the packets obtained continuously from a same PLP, and the processing section processes a group of the packets ranging from the packet to which the identification information is added to a packet immediately preceding a next packet to which the identification information is added, as the packets belonging to the same PLP.

(4)

The reception apparatus as stated in paragraph (1) above, in which the packets may each be divided into divided packets or a plurality of the packets may be connected into a connected packet, and the demodulation section adds the identification information to the divided packets or to the connected packet.

(5)

The reception apparatus as stated in paragraph (4) above, in which the divided packets include segmentation packets or concatenation packets stipulated by the ATSC (Advanced Television Systems Committee) 3.0.

(6)

The reception apparatus as stated in any one of paragraphs (1) to (5) above, in which the packets accommodate IP (Internet Protocol) packets including UDP (User Datagram Protocol) packets.

(7)

The reception apparatus as stated in paragraph (6) above, in which the packets include ALP (ATSC Link-Layer Protocol) packets stipulated by ATSC 3.0.

(8)

The reception apparatus as stated in any one of paragraphs (1) to (7) above, in which the identification information includes a PLP_ID.

(9)

The reception apparatus as stated in any one of paragraphs (1) to (8) above, in which the demodulation section includes a demodulation device, and the processing section includes a System on Chip (SoC).

(10)

A data processing method for a reception apparatus that includes a demodulation section configured to demodulate packets obtained with respect to each of a plurality of PLPs included in a broadcast signal, and a processing section configured to process the packets demodulated by the demodulation section, the demodulation section and the processing section being connected with each other via a single interface or interfaces fewer than the number of the PLPs, the data processing method including the steps of:

by the demodulation section, adding identification information to a specific packet among the packets obtained with respect to each of the PLPs, the identification information identifying the PLP to which each of the packets belong; and by the processing section, identifying the PLP to which belongs each of the packets input from the demodulation section via the single interface or the interfaces fewer than the number of the PLPs, on the basis of the identification information obtained from the specific packet.

REFERENCE SIGNS LIST

1 Broadcast system, 10 Transmission apparatus, 20 Reception apparatus, 30 Transmission path, 111 Multiplexer, 112 Modulation section, 211 Demodulation section, 212 Processing section, 231 Frame processing section, 232-1 to 232-4 FEC processing section, 233 Demodulation multiplexer, 241 Demultiplexer, 242-1 to 242-4 Decapsulation section, 1000 Computer, 1001 CPU

The invention claimed is:

1. A reception apparatus comprising:

a demodulation circuit configured to demodulate packets obtained with respect to each of a plurality of Physical Layer Pipes (PLPs) included in a broadcast signal; and a processing circuit configured to process the packets demodulated, wherein the demodulation circuit and the processing circuit are connected with each other via a single interface or interfaces fewer than a number of the PLPs, the demodulation circuit adds a first Physical Layer Pipe (PLP) identification number in a first Private User Data (PUD) of a first packet among the packets obtained with respect to each of the PLPs, the first PLP identification number identifying a first PLP to which one or more of the packets belong, and the demodulation circuit suppresses a second PLP identification number in a second PUD of a second packet among the packets when the second PLP identification number is same as the first PLP identification number, the processing circuit identifies the first PLP to which belongs one or more of the packets inputted from the demodulation circuit via the single interface or the interfaces fewer than the number of the PLPs, based on the first PLP identification number obtained from the first packet.

2. The reception apparatus according to claim 1, wherein the demodulation circuit adds the first PLP identification number to a first packet of the packets obtained continuously from a same PLP, and the processing circuit processes a group of the packets ranging from the packet to which the first PLP identification number is added to a packet immediately preceding a next packet to which the first PLP identification number is added, as the packets belonging to the same PLP.

3. The reception apparatus according to claim 1, wherein the packets may each be divided into divided packets or a plurality of the packets may be connected into a connected packet, and the demodulation circuit adds the first PLP identification number to the divided packets or to the connected packet.

4. The reception apparatus according to claim 3, wherein the divided packets include segmentation packets or concatenation packets stipulated by Advanced Television Systems Committee 3.0.

5. The reception apparatus according to claim 1, wherein the packets accommodate Internet Protocol packets including User Datagram Protocol packets.

6. The reception apparatus according to claim 5, wherein the packets include Advanced Television Systems Committee (ATSC) Link Layer Protocol packets stipulated by ATSC 3.0.

7. The reception apparatus according to claim 1, wherein the first PLP identification number includes a PLP_ID.

8. The reception apparatus according to claim 1, wherein the demodulation circuit includes a demodulation device, and the processing circuit includes a System on Chip.

9. A data processing method for a reception apparatus, the data processing method comprising:

demodulating, by a demodulation circuit, packets obtained with respect to each of a plurality of Physical Layer Pipes (PLPs) included in a broadcast signal;

processing, by a processing circuit, the packets demodulated, wherein the demodulation circuit and the processing circuit are connected with each other via a single interface or interfaces fewer than a number of the PLPs;

adding a first Physical Layer Pipe (PLP) identification number in a first Private User Data (PUD) of a first packet among the packets obtained with respect to each of the PLPs, the first PLP identification number identifying a first PLP to which one or more of the packets belong;

suppressing a second PLP identification number in a second PUD of a second packet among the packets when the second PLP identification number is same as the first PLP identification number; and identifying, by the processing circuit, the first PLP to which belongs one or more of the packets input from the demodulation circuit via the single interface or the interfaces fewer than the number of the PLPs, based on the first PLP identification number obtained from the first packet.

* * * * *